United States Patent [19]

Andrews et al.

[11] Patent Number: 4,649,390

[45] Date of Patent: Mar. 10, 1987

[54] TWO DIMENSION RADAR SYSTEM WITH SELECTABLE THREE DIMENSION TARGET DATA EXTRACTION

[75] Inventors: LaVern A. Andrews, Fullerton; Dennis Moraitis, Yorba Linda, both of Calif.

[73] Assignee: Hughes Aircraft Company, Los Angeles, Calif.

[21] Appl. No.: 520,408

[22] Filed: Aug. 5, 1983

[51] Int. Cl.⁴ .................... G01S 13/42; G01S 13/72
[52] U.S. Cl. ................................. 342/140; 342/81; 342/158; 342/195
[58] Field of Search ............... 343/7 G, 7 A, 7.4, 7.5, 343/7.9, 5 DP, 16 LS; 342/81, 140, 158, 195

[56] References Cited

U.S. PATENT DOCUMENTS

| | | | |
|---|---|---|---|
| 3,083,360 | 3/1963 | Welty et al. | 343/5 |
| 3,308,456 | 3/1967 | Levenson et al. | 343/7 A |
| 3,328,797 | 6/1967 | Jorna et al. | 343/7.9 |
| 3,618,086 | 11/1971 | van Staaden et al. | 343/7.5 |
| 3,858,208 | 12/1974 | Parke et al. | 343/5 DP X |
| 3,971,020 | 7/1976 | Howard | 343/7.9 |
| 4,005,415 | 1/1977 | Kossiakoff et al. | 343/5 VQ |
| 4,034,374 | 7/1977 | Kruger | 343/16 LS X |
| 4,158,840 | 6/1979 | Schwab | 343/6 |
| 4,342,997 | 8/1982 | Evans | 343/16 |
| 4,531,125 | 7/1985 | Beyer et al. | 343/7.9 |

OTHER PUBLICATIONS

M. I. Skolnik, Introduction to Radar Systems, McGraw-Hill, 1980, pp. 541-547.
Conference Proceedings of the 12th European Microwave Conference 82, Sep. 13-17 1982, Helsinki, Finland, Microwave Exhibitions and Publishers Ltd., "A High Performance Tactical 3-D Radar for the 1980's", K. F. Horenkamp and T. E. Keast.

Primary Examiner—T. H. Tubbesing
Assistant Examiner—Gilberto Barrón, Jr.
Attorney, Agent, or Firm—T. A. Runk; A. W. Karambelas

[57] ABSTRACT

A single two dimension radar system having the capability of developing two dimensional data on all targets in its surveillance volume and three dimensional data for selected targets in its surveillance volume is disclosed. A single phased array antenna having two selectable elevation beam patterns, a wide beam and a narrow beam, is rotated in azimuth. In the two dimension mode, targets are detected and tracked in an azimuth and range position through use of the wide elevation beam. Upon selecting a particular target in track for three dimension data extraction, the radar system changes to the three dimension mode prior to the azimuth position of the selected target, and performs a sequential lobing process of the narrow beam in elevation angle. The power ratios of the target returns in the sequential lobes are analyzed and an elevation position of the selected target is determined. The radar system reverts to the two dimension mode after leaving the azimuth position of the selected target.

17 Claims, 25 Drawing Figures

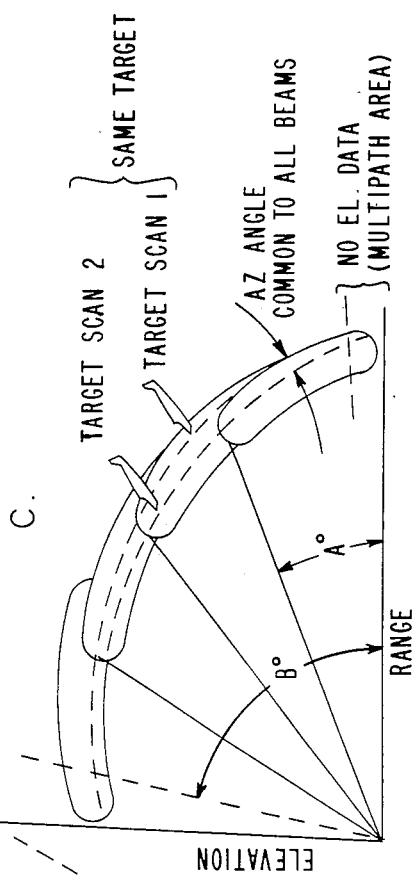
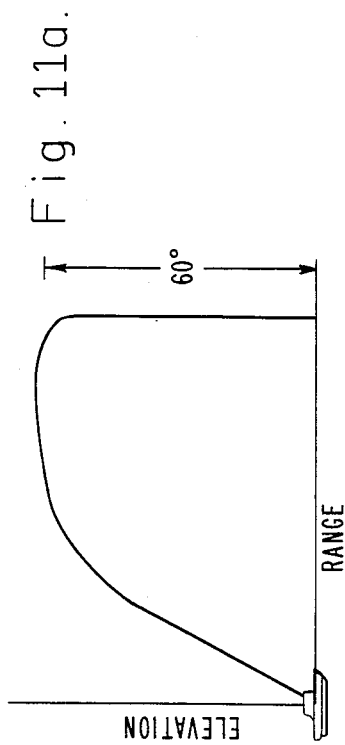
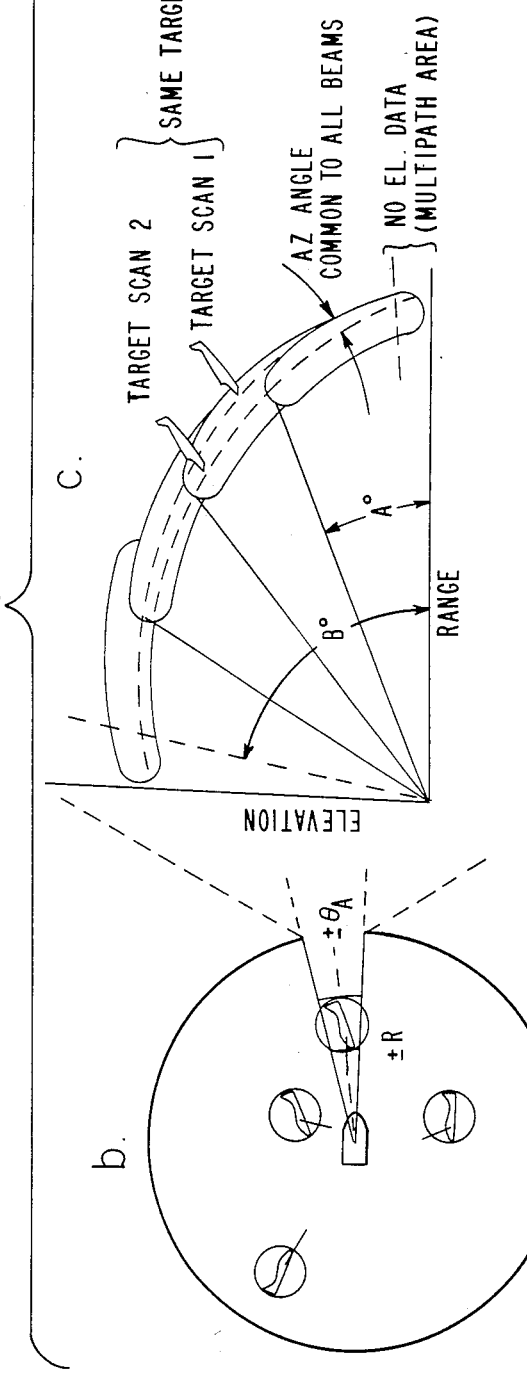
Fig. 11.
Fig. 11a.

TWO DIMENSION RADAR SYSTEM WITH SELECTABLE THREE DIMENSION TARGET DATA EXTRACTION

BACKGROUND OF THE INVENTION

1. Field of the Invention

The invention relates to a radar system and more particularly to a single radar system which is controllable in real time between two target location modes, the first mode being a two dimension mode where targets are located (detected and acquired) and tracked in azimuth and range and the second mode being a three dimension mode where selected tracked targets are located in a third dimension, elevation angle or height.

2. Description of the Prior Art

A wide variety of radar systems is presently available for locating target positions and for tracking these targets as they pass through a radar system's surveillance volume. For purposes of this discussion, the targets which are to be detected and tracked are capable of motion in three dimensions, for example, aircraft and missiles. These targets can be followed or tracked in two dimensions or three dimensions, however in the performance of some services, such as designating a target to a military fire control system or for vectoring a target between positions, three dimension target data may be required while other services require only two dimension target data.

There is a demand for a radar system which possesses both the capabilities of a two dimension (2D) radar and those of a three dimension (3D) radar. Two dimension surveillance, mechanically scanning radars are typically simple and economical and usually determine the azimuth and range of targets by generating a fan beam in the elevation plane and mechanically rotating that beam throughout a 360° azimuth angle. This is the most efficient and economical Track While Scanning (TWS) system for detection and tracking of targets either manually or automatically. It has the shortest response time over a 360° surveillance volume and has the least amount of equipment to provide the necessary signal-to-noise (S/N) ratio to ensure effective detection and tracking of targets. Most current day radars are of the 2D type. However, in many instances a target must be located in three dimensions, i.e., range, azimuth and elevation angle or height above sea level for the performance of a particular system mission. Single 3D radars produce the required 3D data, but they produce 3D data on all targets within the surveillance volume whether 3D data is required or not. They are typically complex, expensive, heavy in antenna weight, have low S/N ratios due to fewer target pulse repetition frequency (PRF) returns and provide the 3D target data by electronically scanning multiple pencil beams or by stacked pencil beams that cover the surveillance volume. As a consequence, radar energy and time are wasted due to the spotlighting of each 3D space resolution element in the surveillance volume since normally there are fewer targets in the surveillance volume for which 3D data is required than there are for which only 2D data is required. In addition, it requires considerably more time for the smaller pencil beamwidth 3D radars to scan the same volume as 2D radars therefore 3D radars have a slower data rate for detection and tracking of new targets in the surveillance volume. Generally, 3D radar designs are a compromise between detection range capability, data rate and resolution. Accordingly, the qualities of reliability, data rate, and detection probability are typically less than what would be available in a 2D radar system.

A variety of techniques is presently available to selectively obtain two dimension or three dimension data about targets in the radar system surveillance volume. One technique is the use of a search radar (2D radar) combined with voluntary target response. The search radar locates targets in azimuth and range and when a target is selected for determination of its third dimension, i.e. elevation, voice communication or other means such as IFF is used. In many cases however, this cooperative method is not feasible and it is desirable to locate targets in the third dimension without having to rely on a voluntary response from that target, especially where the target is uncooperative in nature or does not carry special reponse equipment.

Another technique known in the art is the combination of a two dimension search radar system with a height-finding radar system or a Fire Control System associated with a weapon system. These individual radar systems remain autonomous but cooperate in such a way as to selectively produce the 3D target data desired. In this technique, a search radar locates and tracks targets in two dimensions initially. When a target is selected for height data determination, a second radar system which has a narrow elevation beamwidth is given the azimuth and range of the target and this second radar locates the target additionally in elevation. Another application of this technique is also found in certain weapon fire control systems. In that application, surveillance efficient, automatic tracking, 2D target designation radars are used in cooperation with a 3D weapon fire control radar system. The 2D designation radar system will provide a range and azimuth of a selected target for designation to a fire control system when the target is within or near the weapon system capability envelope. The gathering of the elevation data, however, occurs after designation of the target to the weapon system 3D fire control radar. This causes a relatively slow response time to achieve an intercept on a designated target since the two dimension data of the target must be transmitted to the second radar and then the target must be located in elevation by the second radar before consideration of intercept point, weapon firing, and weapon guidance can occur. This is a procedure similar to the search and height finder radar operations discussed above. Obvious disadvantages are that two complete and independent radar systems are required with a suitable communication link between them and additional response time is required to provide the 3D data.

Another technique known in the art is the use of a 2D radar system having a height-finding attachment located on the same radar antenna pedestal. A radar system such as this is disclosed in U.S. Pat. No. 4,158,840 to Schwab. In Schwab, targets which are being tracked in two dimensions, i.e., azimuth and range, are designated to the height-finding attachment for determination of elevation position when required. Schwab discloses that the height-finding attachment consists of adding a second antenna to the radar by mounting it on the back surface of the existing search 2D antenna platform, and adding necessary autonomous height-finding radar transmitting/receiving and signal processing equipment to the two dimension search radar.

Adding an antenna to the search antenna platform has certain disadvantages, such as increased weight, wind resistance, alignment difficulties, additional rotary joint, etc. The addition of second transmitter/receiver equipment and a signal processor substantially increases the expense and size of the system. There are essentially two separate, independent radar systems operating on a common platform or pedestal with a communication link between them.

In summary, in providing 3D target data on selected targets for performing system missions such as civil or military aircraft control, designation/assignment of missile or aircraft targets to weapon control systems for area or point defense operations, etc., the prior art comprises the combination of two separate radar systems which operate over a mutual communication link or a single complex 3D radar system with single or multiple pencil beams. Typically, 3D data is not required on all targets within a surveillance volume and only those targets which are to be specially controlled or designated need to be identified by 3D data. Also, 3D data is typically not needed initially, but only when the selected mission targets are to be specially controlled or designated after they have been detected, acquired, tracked and identified for a particular time period. For a further discussion of prior methods, refer to M. I. Skolnik, INTRODUCTION TO RADAR SYSTEMS, 2d ed., 1980, pp. 541-547.

It is a purpose of the invention to provide a single radar system (i.e., one antenna, one receiver, one transmitter, one signal processor, etc.) which possesses both the capabilities of a two dimension surveillance/TWS radar system and those of a three dimension radar system and is manually (operator controlled) or automatically controllable between providing two dimension target data and three dimension target data either in the same scan or in subsequent scans depending on the mission need for elevation angle or height data.

It is also a purpose of the invention to provide a radar system possessing both the capabilities of a two dimension radar system and those of a three dimension radar system which is electrically and mechanically simpler and less expensive than prior art systems and techniques.

It is also a purpose of the invention to provide a method of adapting a conventional two dimension radar system which locates targets in azimuth and range to also provide elevation or height data of selected targets without impairing the normal functioning of the original 2D radar system.

It is a further purpose of the invention to decrease response time between selecting a target for determination of elevation data and obtaining that elevation data.

It is a further purpose of this invention to provide the 3D target data at a higher data rate than is achievable from a prior art mechanically rotating 3D radar or the prior art method of using two separate radar systems.

It is a further purpose of this invention to provide sufficient data to a weapon system such as a missile that does not require a constant external guidance from a continuous or sample data guidance system thereby eliminating the need for providing such a fire control system.

SUMMARY OF THE INVENTION

The above purposes and additional purposes are accomplished by the invention wherein a single conventional two dimension surveillance, search-track while scan or designation radar system utilizes a phased array antenna that can selectively and instantaneously change its elevation beam pattern while in continuous azimuth scan to provide three or four dimensions of track data, i.e., range, azimuth, elevation angle and the fourth dimension can be target range rate or closing rate, for selected targets within its surveillance volume. Unselected targets will be contained within the radar system in a 2D data format. These targets will be continuously detected and tracked only in 2D which is the most efficient method to use for following a target in the surveillance volume. A complete radar system may be constructed according to the invention, or an existing two dimension radar system may be modified to incorporate the invention.

In the invention, a mechanically rotating phased array antenna is used to scan in both the azimuth direction and the elevation direction. The azimuth direction is scanned by the continuous mechanical rotation of the antenna. In the elevation direction, the antenna is further capable of providing two beamwidths, a wide angle beamwidth used as a fan beam for the detection, tracking and classification process and a narrow angle beamwidth, electronically scannable in elevation which is used for elevation or height measurement. The narrow beamwidth is electronically scannable in the elevation direction to perform a sequential lobing process on selected tracked targets which were obtained through the use of the wide angle elevation beamwidth. The phased array antenna receives selected phase shift command words from the data processing equipment of the radar system through a beam steering unit. These command words set the direction and width of the beam in elevation. The beam steering unit is coupled to the data processing equipment of the radar system and receives frequency, antenna beam position correction and beam spoiling data from the data processing equipment for translation and forwarding to the antenna. A phased array antenna is used in the invention in order to obtain real time, instantaneously (e.g., within a few microseconds) selectable wide and narrow elevation angle beam patterns.

In the invention, there are two target location modes, a two dimension (2D) mode where targets are located and tracked in azimuth ($\theta_A$) and range (R) and a three dimension (3D) mode where selected R, $\theta_A$ targets are located in elevation. In the 2D mode, the data processing equipment which typically includes a computer or special purpose signal processor, will set the antenna to a wide elevation beamwidth such as a fan beam. Target return signals will be processed to extract azimuth and range position data for purposes of performing the automatic track while scan operations which are well known to those skilled in the art. In the 3D mode, the data processing equipment will set the antenna to a narrow elevation beamwidth at a selected azimuth position or azimuth window $\pm \theta_A$ about a selected target (R, $\theta_A$) predicted position. The method of selecting the target for the gathering of elevation angle and/or height data can be operator initiated (manual) or automatically accomplished by the data processing equipment based on an algorithm, e.g., the target will be designated to a weapon system based upon its position relative to that system. The data processing equipment will cause the antenna to scan the narrow beam in elevation through sequential overlapping positions to perform a sequential lobing process which is well known to those skilled in the art. The target return signals received during this sequential lobing process are measured on all beam lobes within the selected R, $\theta_A$ window by an elevation measurement unit. All detected target reports in this 3D processing interval are used to update the tracking process and predicted target location. However only the target reports correlating with the appropriate selected target location within the R, $\theta_A$ window are used for elevation data measurement. In this manner, the selected target is appropriately updated in R and $\theta_A$ and in addition has a measured elevation angle to provide a 3D output. Utilization of trigonometry formulas for slant range and elevation angle will provide height data.

The elevation angle measurement unit is a data processing device which is a modification to a conventional two dimension radar system. It is coupled to the receiver apparatus and the computing apparatus of the radar data processing equipment. It may be implemented either by hardware or software. The receiver provides the elevation angle measurement unit with the processed video signals generated from target returns received during the sequential elevation lobing process. The computer provides the elevation angle measurement unit with a predicted range and azimuth window of the target. The elevation angle measurement unit will associate the two highest video signals of the sequential narrow elevation angle beams that occur on adjacent elevation beams and are within the range and azimuth window. The elevation angle measurement unit will provide target return power ratio measurements for adjacent overlapped elevation beams to the computer or special purpose processor regarding the selected target. Since phased array antenna characteristics in terms of adjacent beam power ratio and elevation angle are well known, a stored computer table look-up method will indicate the measured elevation angle of the selected target. The computer or special purpose processor receives the power ratio measurements from the elevation angle measurement unit, determines the target elevation angle from its stored table and processes this result to provide three dimension data on the target, i.e, elevation angle and/or height above mean sea level.

A new or modified two dimension radar computer program is used in the invention. It will provide the timing and control at the selected target R, $\theta_A$ window for the elevation angle scanning process and will provide measurement of the target elevation angle and target height. The measured elevation angle, coupled with the R, $\theta_A$ of the selected target, can then be output to a weapon system to engage the target or the height data can be displayed to an operator for aircraft control or for other purposes.

Operationally, the radar system incorporating the invention will normally be tracking targets in two dimensions, azimuth and range (2D mode). The wide elevation beam (fan beam) is used for this tracking mode. When a tracked target crosses a predetermined threshold, it may be automatically or manually selected for elevation data extraction. For purposes of clarity of this description of invention operation and not for the purpose of limiting the invention or the application of the invention in any way, it will be assumed that the invention is related to a weapon system. Selection of a tracked target for three dimension data extraction may occur in order to direct gun or missile weapon systems or for vectoring intercept aircraft.

According to the invention, a tracked target may be selected for elevation data extraction manually or automatically. The selection process may be performed by an operator, a computer, or a combination of both. The operator may select a target that is located on his display (e.g., by using a light pen) and request height data on this particular target. The computer will then process this request in the manner indicated in the following paragraphs.

An algorithm may be located in the computer that automatically selects a particular target for elevation angle or height data processing when the tracked target meets certain algorithm criteria. For example, this criteria could be based on: (a) all targets that do not exhibit a friendly IFF response, (b) the system may be integrated with a weapon system where weapon characteristics in terms of intercept range about a particular location and response time are known and when a threat travelling at a particular closing speed arrives at a particular range or bearing from this location, a request for the third dimension can be initiated, (c) all unknown or hostile targets within a certain range to the radar site and ordered in priority according to their closing rates, or (d) any other identifiable criteria amenable for the automatic process. The computer will develop, based on the target selection process, an azimuth and range window, i.e., $\pm\theta_A$ and $\pm R$ about the selected tracked target in preparation for the elevation angle data extraction process. The elevation angle extraction window will typically be a few azimuth beamwidths and a few miles in range commensurate with the prediction accuracy of the two dimension radar data and the possible target maneuvers that could have occurred since last target look measurement period. While the antenna is continuously rotating and when it arrives at the beginning of the azimuth window, the beamwidth will be changed from the wide elevation beamwidth to the narrow elevation beamwidth. The narrow beam is electronically scanned in elevation through the target's azimuth location using a sequential lobing technique. The antenna will continue the sequential lobing process until it reaches the exit side of the azimuth window. Upon exit of the azimuth window, the elevation beamwidth is changed from narrow to wide for continuation of the normal two dimension surveillance and tracking process. During the period when the narrow beamwidth is used, it will continue to detect and report on all targets within the azimuth window, hence, the normal 2D automatic tracking process can continue in parallel with the elevation angle or height extraction process and no detected target data is lost. The developed three dimension target position data on the selected target is available at the appropriate time to be forwarded to the user such as a fire control system or an operator.

If target selection and elevation angle data extraction is accomplished prior to the time a target is designated to a weapon system, the weapon system can acquire the selected target more rapidly and its weapon can be discharged earlier than in prior art systems. Thus, system response time and effective weapon system fire power have been improved over the prior art since the amount of time required by the weapon system to locate the third dimension of the target has decreased substantially.

Thus it can be seen that various tracked targets may be located in two dimensions or in three dimensions as selected. The invention is a single radar system having only one antenna, however it is capable of providing three dimension position data on selected targets as well as two dimension data on all targets contained within its surveillance volume. This capability conserves radar energy, improves detection efficiency and range, improves the data rate, decreases the total system response time for weapon system interception of a threatening target and is more economical. For weapon systems employing active seeker missiles, the invention eliminates the need for a separate fire control system to provide the weapon with elevation angle data; only the invention and the missile are needed to perform the intercept mission. Thus, there is a significant reduction in the amount of equipment and its associated cost. Additional purposes, advantages and characteristics of the present invention will become apparent from the following description considered in connection with the accompanying drawings.

BRIEF DESCRIPTION OF THE DRAWINGS

FIG. 10b is a flow chart of the ELSCAN function of the algorithm referred to in FIG. 10a;

FIG. 10c is a flow chart of the Elevation Extraction function of the algorithm referred to in FIG. 10a;

FIG. 10d is a flow chart of the Waveform Selection function of the alogrithm referred to in FIG. 10a;

FIG. 10f is a flow chart of the ELSCAN Definition function of the algorithm referred to in FIG. 10a;

FIG. 10j is a flow chart of the Cluster/Resolve function of the algorithm referred to FIG. 10a;

FIG. 10k is a flow chart of the Elevation Estimation function of the algorithm referred to in FIG. 10a;

FIG. 11a is an operational side view of a fan beam in accordance with the two dimension mode of the invention;

FIG. 11b is a top view of FIG. 10a; and

FIG. 11c is an operational side view of a three dimension, target data extraction mode in accordance with the invention.

DETAILED DESCRIPTION OF THE INVENTION

Figure 1:
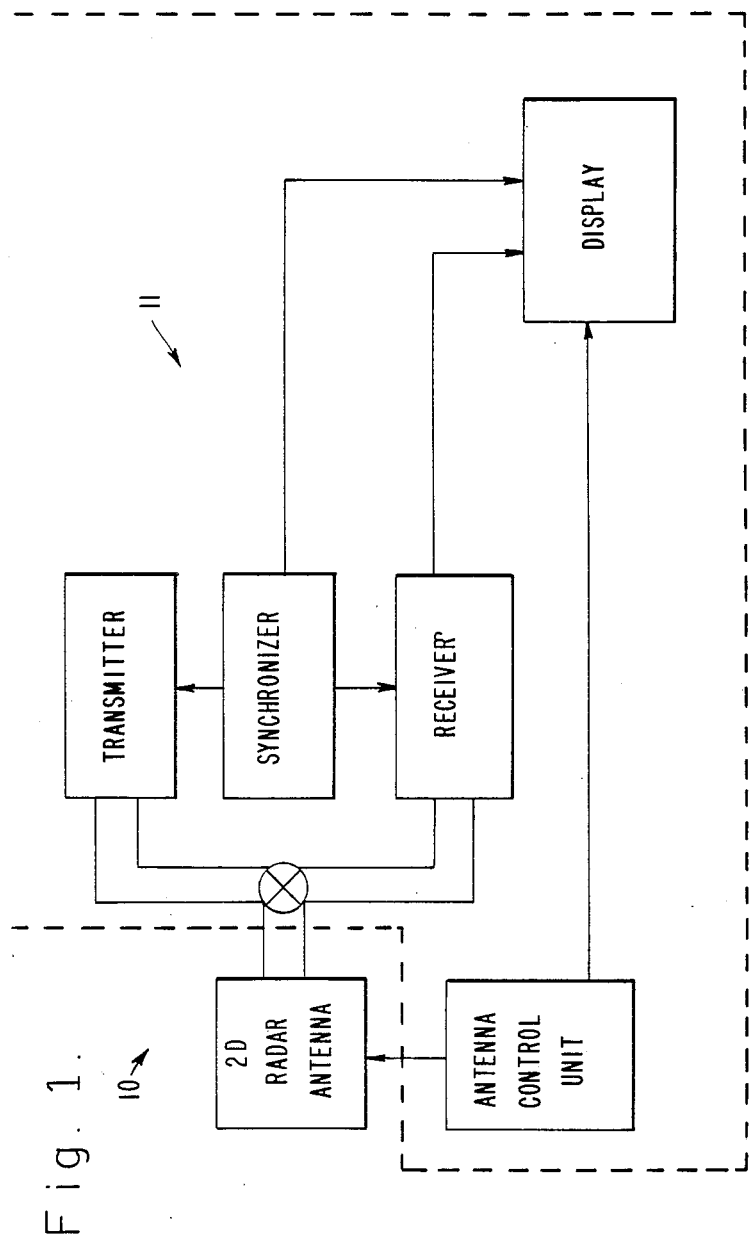
FIG. 1 is a block diagram of a conventional two dimension radar system employing a manual track while scan operation.
Figure 2:
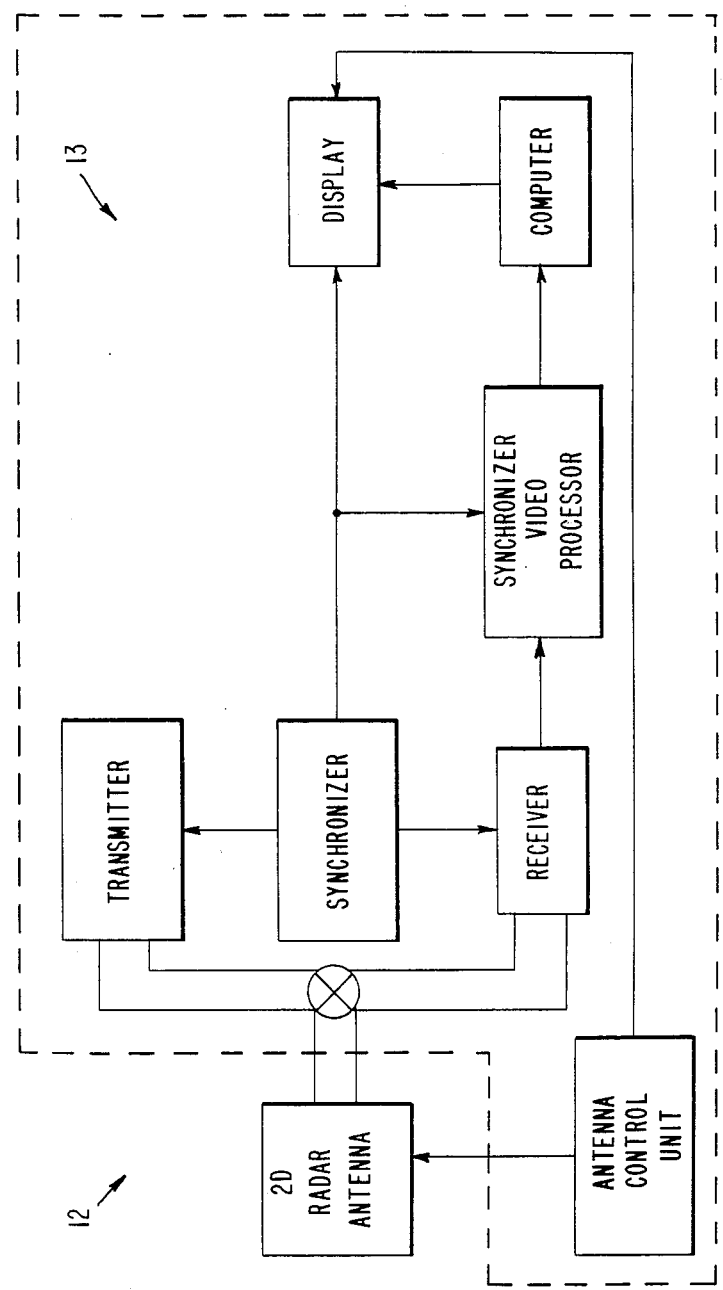
FIG. 2 is a block diagram of conventional two dimension radar system employing an automatic track while scan operation.

Referring to FIGS. 1 and 2 with greater particularity, block diagrams of well known, conventional, surveillance two dimension radar systems are presented. FIG. 1 presents a manual track while scan (TWS) system 10 while FIG. 2 presents an automatic TWS system 12. The operations and techniques of the radar systems presented by FIGS. 1 and 2 are well documented and are understood by those skilled in the art.

Typically, previous systems have employed a fan beam antenna with a relatively small azimuth beamwidth of 2–10 degrees and an elevation beamwidth of 10–75 degrees. In both FIGS. 1 and 2, the antenna is rotated at a fixed rate such as 6–30 RPM while the synchronizer controls the transmission of radio frequency energy from the transmitter and reception of reflected energy through the receiver. The receiver processes the energy for display on an operator's console which has a sweep position synchronized to the antenna's location in the scan interval. In the system depicted in FIG. 1, an operator is utilized who uses a grease pencil to plot a symbol on the face of the console superimposed over the received video, to identify the selected target's track path. This process is continued, on each subsequent scan such that the grease pencil plots show the target's flight path through the radar's surveillance volume. This is the well known technique of manual TWS operation. FIG. 2 represents a more sophisticated radar system that employs signal processing and a computer to perform automatic detection, acquisition and tracking such as is used in most TWS systems after the year 1960. The operator in this case monitors the actions of automatic TWS operations to insure appropriate actions result and can in certain instances also perform manual TWS operations on selected targets up to the limits of his capability.

Figure 3:
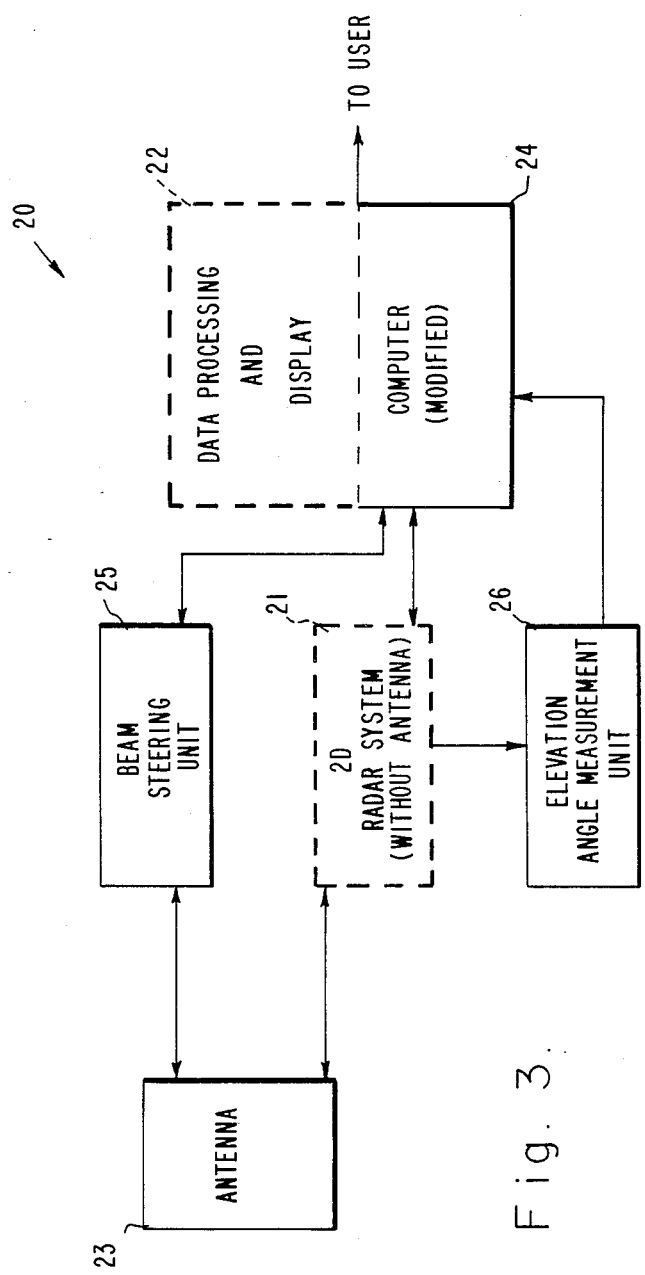
FIG. 3 is a block diagram of a radar system in accordance with the present invention.

Referring to FIG. 3 with greater particularity, a schematic block diagram of a radar system 20 in accordance with the invention is presented. The dashed boxes represent a two dimension radar system and the solid boxes represent its modifications and additions in accordance with the invention. In particular, boxes 21 and 22 in FIG. 3 may comprise system 11 inside the dashed lines of FIG. 1 or system 13 inside the dashed lines of FIG. 2.

In the embodiment presented by FIG. 3, antenna 23 is a rotating phased array antenna with a fixed azimuth beamwidth that has real time selectable wide and narrow elevation angle beam patterns. This antenna 23 replaces those antennas shown in FIGS. 1 and 2. The azimuth direction is scanned by mechanical rotation and the elevation direction is scanned electronically. The wide elevation beamwidth or fan beam is selected for the radar system two dimension (2D) track while scan (TWS) mode while the narrow beamwidth is selected for the elevation angle extraction or three dimension (3D) mode during which a sequential lobing process in elevation angle is used to locate the elevation position of a selected target.

The following is a description of an antenna suitable for use in the invention. It will be readily seen by those skilled in the art that the following antenna is not the only antenna usable. Other antennas and antenna configurations may be used without varying from the scope of the invention.

In particular, antenna 23 is a rotating phased array antenna having a planar array of vertically aligned dipoles that provides elevation phase scan, frequency agility and is capable of transmitting high power as well as having growth potential to back or forward scan in azimuth.

In the narrow pencil beam mode, the radar antenna transmits RF energy into space as a low side-lobe pencil beam pattern which is electronically scanned in elevation by phase shifters. The low side-lobe pattern is achieved by using amplitude tapered distributions in both the azimuth and elevation planes. Phase scanning is achieved by a phase shifter at each dipole in the array. The well known technique of using an air stripline corporate feed and power divider networks allows accurate control of the aperture illumination and provides reliable high power performance.

In the invention, a special purpose or general purpose computer 24 may be used to control the use of these two elevation beam patterns. The computer 24 selects the appropriate beam pattern through beam steering unit 25 which may be physically mounted on the antenna. During the wide elevation beamwidth (fan beam) period, a conventional 2D TWS radar system operation is employed. During the narrow elevation beamwidth, 3D period, the narrow elevation beamwidth is selected by computer 24 through BSU 25, and the received target returns from the sequential lobing process are processed by elevation angle measurement unit 26. The measured results are then sent to computer 24 to provide the precise elevation angle data to a user which may include designation data to a weapon system or conversion to height data as a display readout to an operator.

Figure 4:
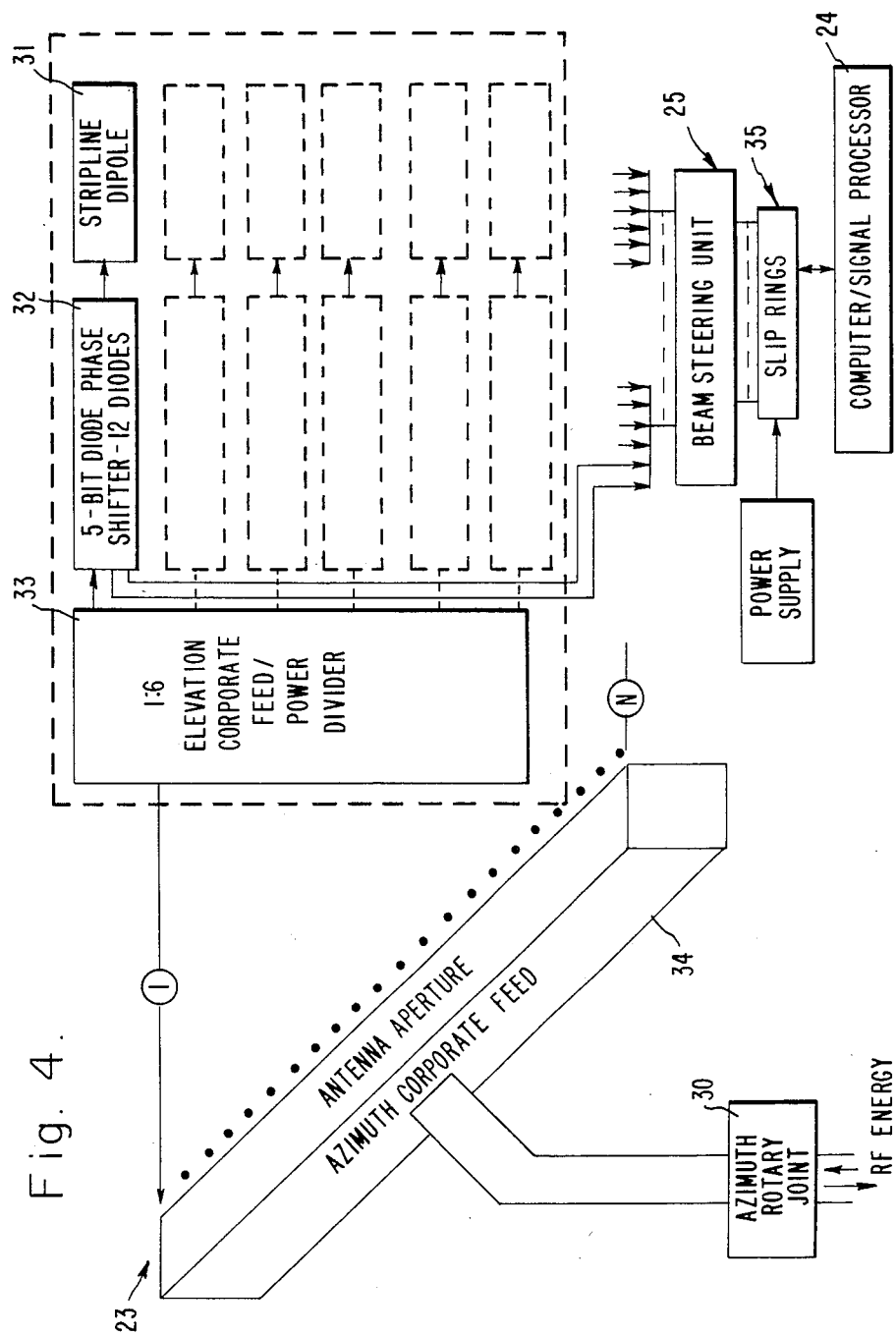
FIG. 4 is a block diagram of a phased array antenna which is usable in the invention.

In the present embodiment the antenna is mounted on a stabilized pedestal. FIG. 4 presents a block diagram of an electronically scanned phased array antenna 23 usable in the invention. A rotary joint 30 provides for multiple RF channels to pass through the rotating pedestal apparatus. Typically, where an existing radar system is modified to incorporate the invention, no changes to the existing rotary joint will be required. Approximately forty slip rings 35 including spares are required by the beam steering unit 25 (discussed below) to provide the power and the phase shift intelligence to the antenna 23 for developing the multiple elevation beamwidths. This data must also traverse the rotating portion of the antenna.

Transmitter power received through the rotary joint 30 is divided by the azimuth and the elevation corporate feeds 34 and 33 respectively and then distributed by the phase shifter package 32 to the radiating element 31. The power distribution is such as to achieve a 30 dB Taylor aperture distribution in both the azimuth and elevation planes of the array. The aperture size in this embodiment is 168 inches long by 27 inches in height.

A vertically polarized radiating aperture forms a planar array dipole matrix and is composed of six vertical rows of dipoles by twenty-six dipoles 31 (156 dipoles or radiating elements) fed by 5-bit diode phase shifters 32 and 1:6 elevation corporate feed/power dividers 33.

Figure 5:
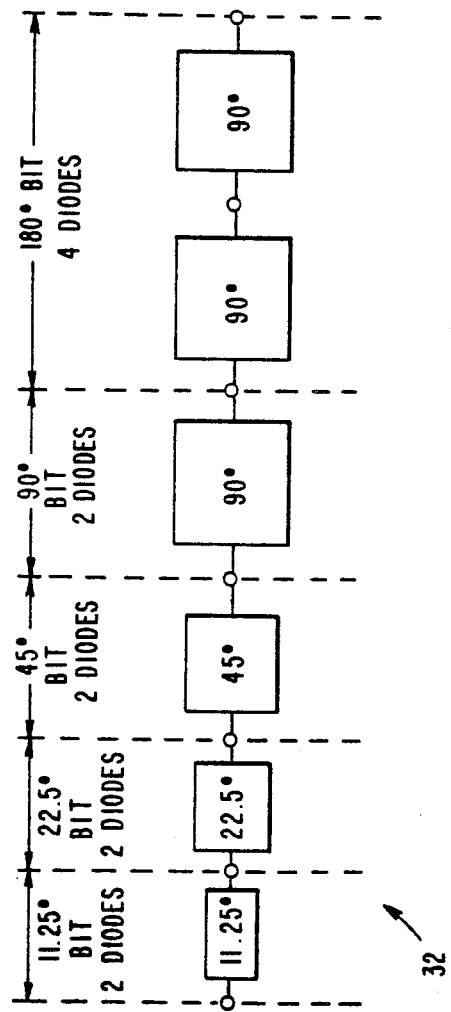
FIG. 5 is a block schematic diagram of a phase shifter arrangement usable in the invention.

FIG. 5 depicts a phase shifter assembly which is usable in the invention. Phase shifters 32 of differing amounts accompanied with the number of diodes used are shown in FIG. 5. Phase shifters are well known in the art and are not described here with greater specificity. Refer to M. I. Skolnik, *Radar Handbook*, McGraw-Hill, 1970, pgs. 12-1 through 12-65 for a more detailed discussion of phase shifters. Diodes which are usable in the invention are the well known PIN type.

In the present embodiment, the narrow beam is scanned in elevation from −40 degrees to approximately 50 degrees above the horizon (beam center) by the phase shifters 32 which insert a linear, frequency-independent phase delay between elevation elements of the array. The azimuth beamwidth is 3.4 degrees and the narrow elevation beamwidth is 21 degrees, however, these are representative of a particular design and could be of any value consistent with aperture size, transmission frequency, etc. With a six element elevation array, it is necessary to mechanically tilt the antenna back approximately 30 degrees in order to eliminate the presence of grating lobes caused by the electronic scanning process.

In order to obtain the relatively wide beamwidth in elevation for fan beam operation, the narrow beam may be phase spoiled to provide a single wide angle elevation beam covering the entire scan volume with an azimuth beamwidth identical to the narrow beam. The narrow beam or the phase spoiled beam may be back scanned in azimuth by providing column to column phase control. In this embodiment, the antenna is mechanically rotatable in azimuth, however small amounts of electronic back scan in azimuth are used to insure proper stacking of the pencil beam for the sequential lobing process and for space stabilization of the beam, if used on a ship for example.

The 156 radiating elements 31, 5-bit diode phase shifters 32 and air stripline corporate feed/power dividers 33 are simple, inexpensive components and may be readily produced on a set of plug-in circuit cards (1 to N). Manufacturing tolerances have only minor effects on average side-lobe levels at L-Band.

Scanning in elevation is performed by electronic phase shifters 32. The antenna 23 provides elevation scan at any frequency in the operation band. The 5-bit phase shifters 32 located at each dipole element 31 perform row phase shifts necessary to scan the beam. Since a corporate feed 33 is used in the power division network, compensation in the phase distribution is required only to account for the frequency dependence of the element spacing when the frequency is changed.

With the antenna tilted back 30 degrees, the spacing of the elevation array dipoles 31 allows ample margin for scanning between −40 degrees and +50 degrees (earth reference coordinates −10° to +80°) with six elevation elements without the formation of degrading grating lobes. The variation of gain with elevation scan will be approximately $(\cos \theta)^2$. The gain variation between antenna broadside and the maximum degree scan angle will be on the order of ±1 dB one way, exclusive of beam spoiling.

Figure 6A:
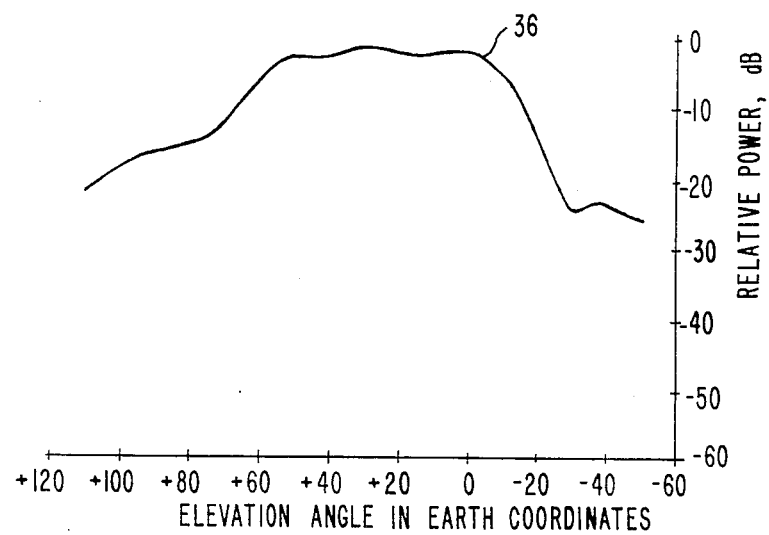
FIG. 6a depicts a fan beam in elevation which is usable in the two dimension mode of the invention.
Figure 6B:
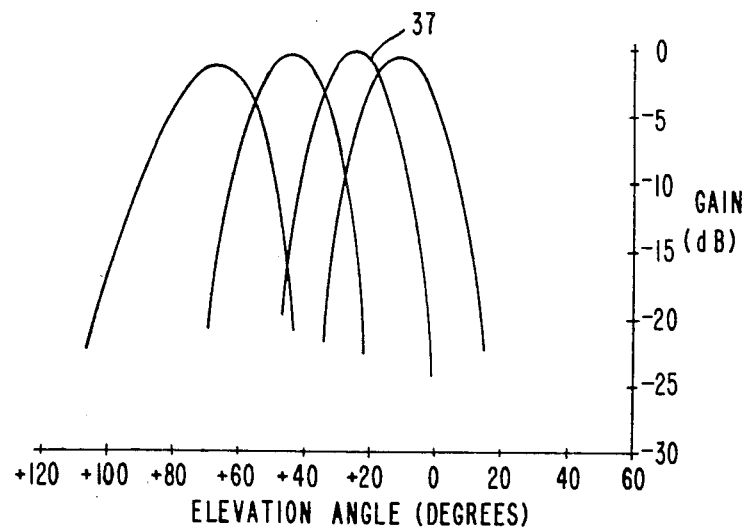
FIG. 6b depicts a narrow beam sequence in elevation which is usable in the three dimension mode of the invention.

FIGS. 6a and 6b represent two elevation angle beam patterns usable in the invention. FIG. 6a shows the phase spoiled pattern 36 which is a fan beam and FIG. 6b shows the narrow beam pattern 37 which is, at a minimum, scannable through pattern 36.

Figure 7:
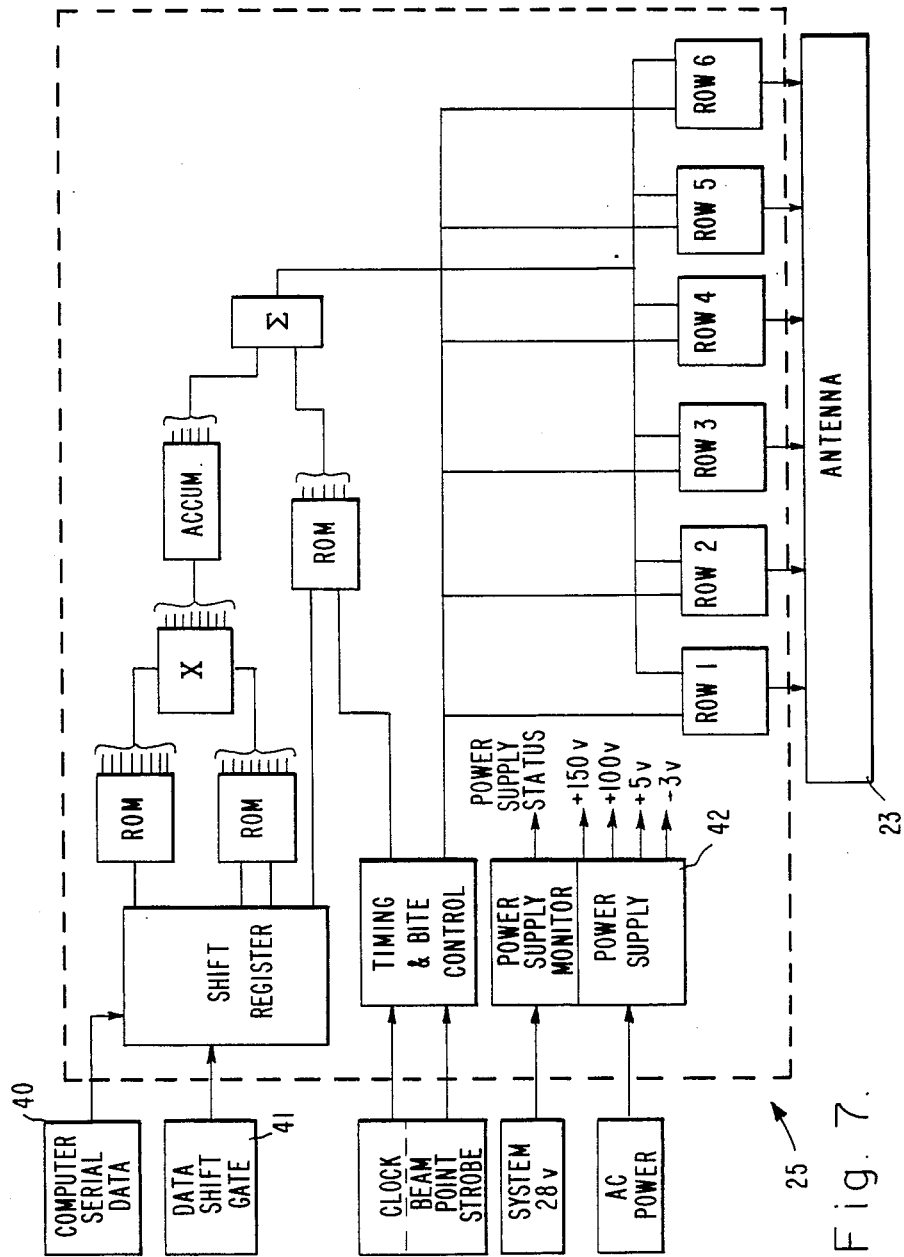
FIG. 7 is a block diagram of a beam steering unit which is usable in the invention.

In the present embodiment, a beam steering unit (BSU) 25 is coupled to the antenna 23 to control the antenna beam pattern. A beam steering unit usable in the invention is presented in FIG. 7. Computer serial data 40 regarding elevation beam position data is provided to the BSU 25 through the slip rings 35. The data 40 consists of eight or more beam positions (e.g., four primary, four secondary and one special), up to sixteen values of pitch corrections (shipboard application), transmission frequency and a single bit to indicate beam spoiling requirements. The four primary beam positions are for the initial four beam sequential lobing process in the elevation measurement interval and the four secondary beams are used for the following scan sequential lobing process in the elevation measurement interval to improve the measurement accuracy. This digital data 40 is used to calculate inter element phase shift $\Delta\Psi$ for each row of the six elevation diode phase shifters 32 by means of the following formula:

$$\eta\Delta\psi e1 = \frac{2\pi df}{c} \sin(\phi + \alpha) \quad (1)$$

where:
- $\phi$ = elevation beam position, antenna coordinates
- $\alpha$ = corrects antenna position for pitch
- f = transmission frequency
- $\eta$ = 1 to 6 (one for each six elevation phase shifters 32)
- d = element spacing
- c = speed of light In addition, when the spoiled beam is required, the BSU 25 generates and adds the spoiling function to the output of $\eta\Delta\Psi e1$ to point the fan beam. This data is sequentially provided to the drivers at the beam point strobe time (change beam postion time) to set the respective diode phase shifters 32 to control beam shape and position. AC prime power is supplied via the slip rings 35 to provide the necessary DC power for the BSU 25 digital circuitry by means of integral power supplies 42. Special features of the BSU 25 include minimizing the slip ring requirement by inputting the data in a serial rather than parallel format and minimizing the driver cards by controlling up to seven array phase shifters with one driver. The BSU 25 may also contain automatic test features to detect faulty circuits.

In the present embodiment, the BSU 25 input data consists of two sets of 8-bit computer words 40. One set, the beam position and associated pitch correction, selects the one of eight possible antenna elevation beams and is received coded into a 4-bit word. The other set, the radar transmission frequency and beam spoiling, is used to compensate the phase shifters 32 for the phase dependency of the corporate feed 33 in the antenna elevation plane and to select the fan beam or built-in wide angle elevation beamwidth.

As previously discussed, the data 40 is received in a serial format of two 8-bit words, accompanied by a gate 41 from the radar computer 24 indicating that the antenna pointing information is on a data line. When this data is properly loaded, it is automatically decoded to form the six elevation phase shift settings required to position each of the 5-bit PIN diode phase shifters 32. This data is stored in the drivers, which set the phase shifters 32 and hold this setting until the next beam position command.

The phase shifter drivers amplify the logic level phase word inputs to the levels required to control the diode phase shifters 32. Each phase shifter 32 has five discrete inputs. One input controls the 180 degree phase shift bit, one the 90 degree bit, one the 45 degree bit, one the 22.5 degree bit and one the 11.25 degree bit (refer to FIG. 5a). To achieve the reference or zero phase state, a reverse bias of +100 volts is applied to the PIN diodes. The differential phase state requires forward biasing of the diodes with current that is scaled to the particular bit size. The 180 degree bit requires a forward bias current of 400 milliamperes (ma) while the 90, 45, 22.5 and 11.25 degree bits require 300 ma, 200 ma, 150 ma, and 150 ma respectively.

Since there are twenty six (N=26) phase shifters 32 in each row, and each is set to the same phase shift value, a driver could be designed to singularly control all twenty six phase shifters. However, from a practical standpoint, the proposed driver will control only seven phase shifters in a row of twenty six, thus requiring four driver cards for each of the six rows. Each of the twenty four driver cards can drive 10.4 amperes (a), of forward bias to the 180 degree bits, 7.0 a, 5.2 a, 3.9 a and 3.9 a respectively to the 90, 45, 22.5 and 11.25 degree bits.

The BSU 25 may contain built-in test circuits to detect faulty driver circuits, shorted phase shifter diodes and faulty logic circuits. Faulty drivers are detected "on-line" by comparing the output voltage to the input data after the phase shifters have been set. The decode logic utilized is checked "on-line" with a parity check technique. Any detected faults are stored and transmitted to the computer 24 via a serial data word that is sent each time the computer requests a new beam position. In addition to the fault data, the integrity of the input data can be verified by including the received data in the word sent back the computer 24. Thus, the system computer 24 can compare the word received by the BSU 25 with the data word sent to the BSU 25 and verify correctness.

An elevation angle measurement unit continues the elevation angle data extraction process. In the invention, this unit can be implemented in either hardware or software. A hardware implementation will be described first. The target elevation angle is extracted in a module called the elevation angle measurement unit 26. This unit can be part of the radar signal processor or can be a separate add-on unit. An illustration of an elevation angle measurement unit usable in the invention is given in FIG. 8.

The elevation angle measurement unit 26 uses fast digital processing, storage and angle estimation digital logic to perform its function. Sequential lobing detection and angle estimation use the storage of the linear video signal for each range bit within the selected range window of the adjacent beams containing the target. A range cell by range cell detection test is performed by comparing the voltage from the same range cell of the two adjacent beams ($V_{i,j}$ and $V_{i,j+1}$) to a threshold as indicated by the following equation:

Declare a height report if: $V_{i,j} \geq T$ and $V_{i,j+1} \geq T$ \quad (1)

In equation (1), i denotes a particular range cell, j denotes a particular elevation beam, j+1 is the adjacent elevation beam and T is the detection threshold whose value is determined from the false alarm considerations.

Figure 9A:
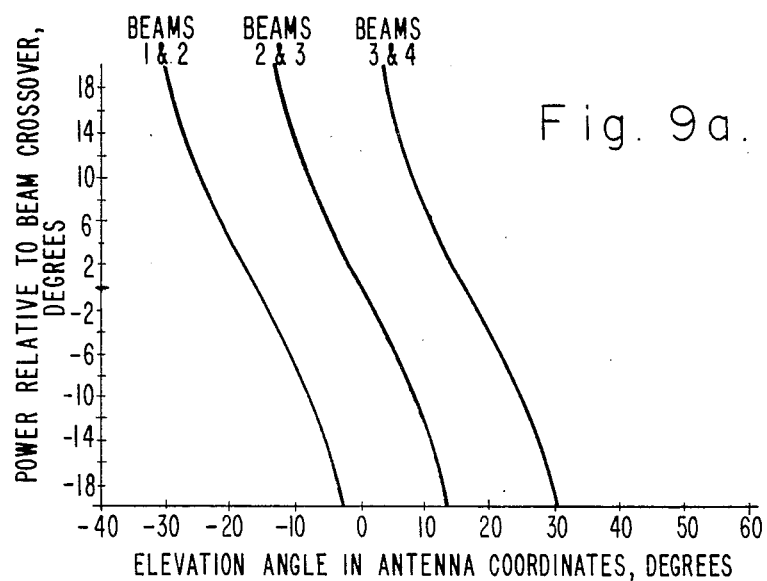
FIG. 9a is a chart which determines elevation angle based on the measured relative power ratios of overlapping narrow elevation beams.
Figure 9B:
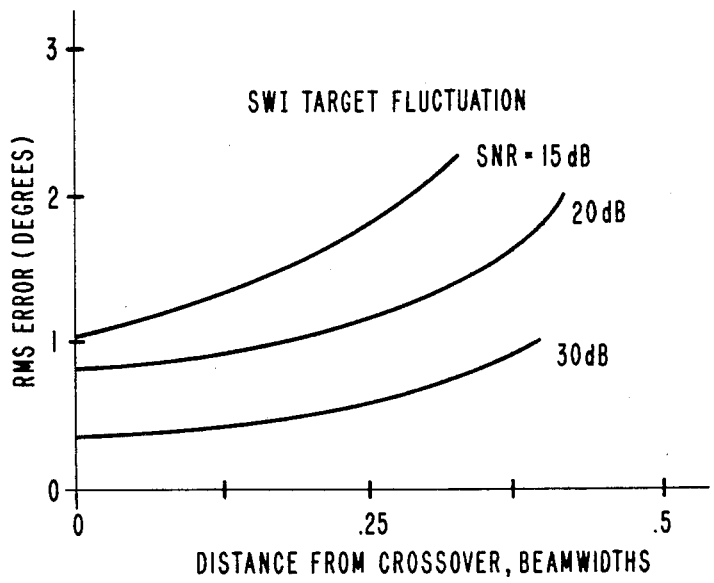
FIG. 9b is a chart showing predicted accuracy of elevation angle estimation.

Given that a target is declared present in range cell i between beams j and j+1, the ratio of the linear video signals from range cell i is used to address a look-up table containing the known antenna angles as indicated by the following procedure:

$$\phi = S\left(\frac{V_{i,j}}{V_{i,j+1}}\right) \quad (2)$$

where $\phi$ is the estimated angle between beams j and j+1, $V_{i,j}$ is the amplitude in range cell i and beam j, and $V_{i,j+1}$ is the amplitude in range cell i and beam j+1, and S represents the sequential lobing slope which is dependent on the elevation beamwidths, beamshape and beam spacing. The theoretical standard deviation in elevation angle ($\sigma\phi$) is dependent on the signal-to-noise ratio (SNR), the elevation beamwidth (BW), the beam elevation stack factor (SF), the elevation beam spacing (BS); and the distance from crossover ($\Delta\phi$):

$$\sigma\phi = \frac{(SF)(BW)}{5.55\sqrt{2\,SNR}}\left[\exp\left(5.56\left(\frac{\Delta\phi + SF/2}{BS}\right)^2\right) + \exp\left(5.56\left(\frac{\Delta\phi - SF/2}{BS}\right)^2\right)\right]^{\frac{1}{2}}$$

where $\Delta\phi$ is the distance from the beam crossover and the SF is the ratio BW/BS. The above equation assumes Gaussian shaped beams and a Swerling V target fluctuation model. FIG. 9a is a plot of sequential lobing slopes and presents amplitude ratio vs. elevation angle for beam pairs (1,2), (2,3) and (3,4) where the indicies represent the elevation beam number going from lowest to highest elevation angle. FIG. 9b shows the RMS elevation error in degrees vs distances from crossover for a Swerling I target fluctuation model.

The angle estimation process is performed on beams: (a) j and j+1, (b) j+1 and j+2, and (c) j+2 and j+3 in a few range cells centered about the target anticipated range. The hardware logic selects the beam pair with the highest amplitude returns in the range/azimuth window to estimate the elevation angle.

Figure 8:
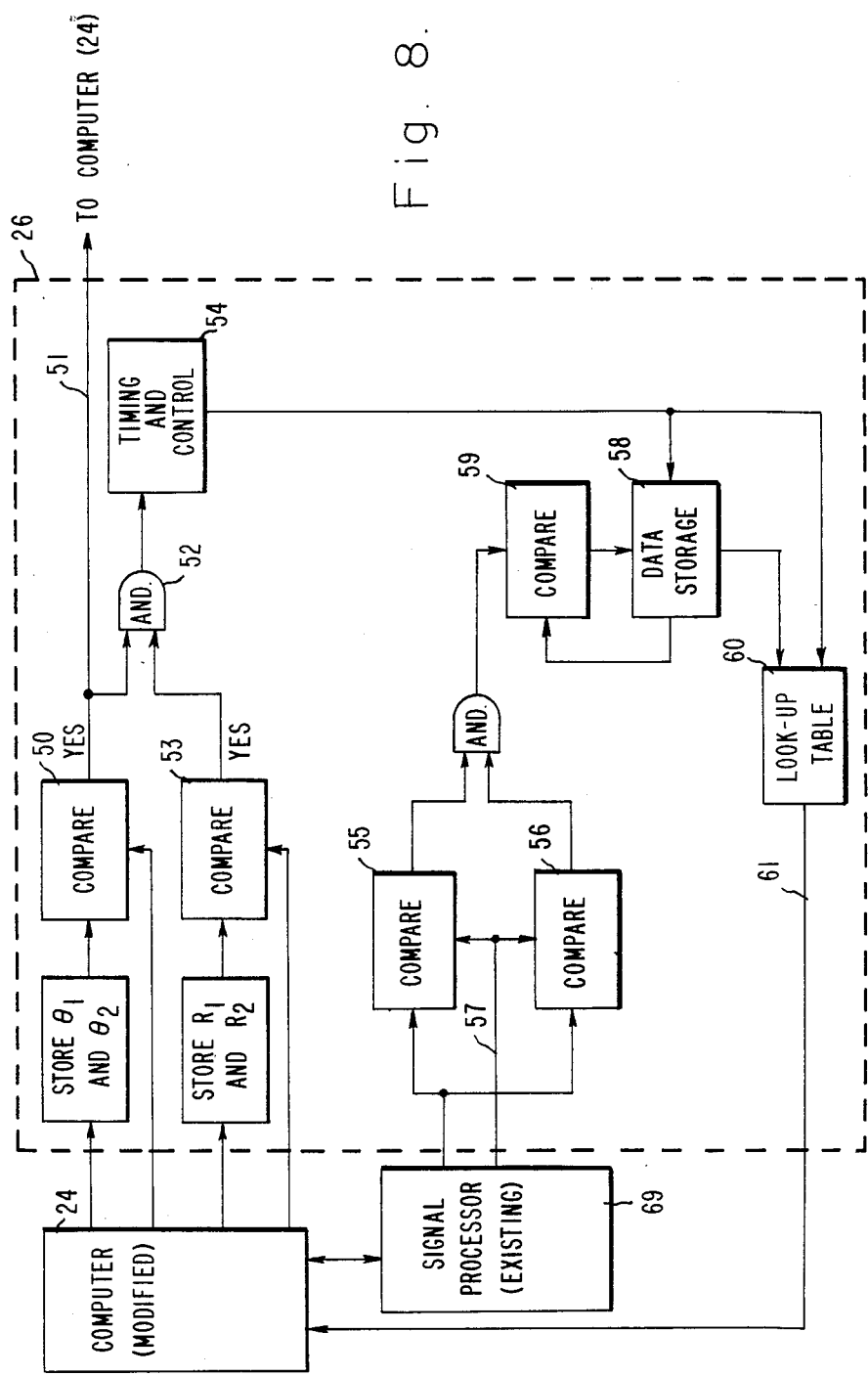
FIG. 8 is a block diagram of an elevation angle measurement unit which is usable in the invention.

Referring to FIG. 8 with greater particularity, a hardware implemented elevation angle measurement unit usable in the invention is presented. The functions of this unit may also be implemented in software as will be later discussed. FIG. 8 is a block schematic diagram of the measurement unit 26 functions required for elevation angle estimation. The height mode is requested by the computer 24 when elevation data on a target presently in track is required. The computer 24 sends a range window (R1 and R2) and an azimuth window ($\theta_1$ and $\theta_2$) to the elevation angle measurement unit 26 when the height mode is requested. The elevation angle measurement unit 26 stores the data and keeps the radar in its present operating mode (two dimension) until the antenna azimuth angle is equal to the start of the azimuth window ($\theta_1$). A comparator 50 in measurement unit 26 determines when the azimuth window has been entered. When this occurs, the height mode is initiated. A signal 51 is sent to computer 24 and the azimuth input of logic device 52 is set.

After the above described azimuth comparison is made, the computer 24 range counter is compared to the lower limit of the range window in comparator 53. When a correlation occurs, data storage is enabled through logic device 52 and device 54. The processed video output from signal processor 69 of selected amplitude pairs (beams j and j+1 for example) are compared in devices 55 and 56 to a threshold 57. Those video amplitudes that meet threshold 57 are used to address look-up table 60 through compare device 59 and data storage device 58. When enabled by timing and control device 54, look-up table 60 will output a power ratio measurement 61 to computer 24. Computer 24 may also be supplied with filter number from a pulse Doppler radar signal processor as an additional correlation parameter. The measurement unit 26 continues this process throughout the azimuth window. The elevation angle estimation is terminated when the antenna azimuth angle exceeds the upper limit ($\theta_2$) of the azimuth window as determined by comparator 50.

A two dimension radar computer program may be modified to accomodate the above described interfaces and provide the user with the additional elevation data on the selected targets. The elevation extraction process is initiated manually or automatically. When done automatically, computations are made in the computer 24 to insure that the elevation data is available at the time it is needed (e.g. for weapon designation).

For the embodiment of the invention in a pulse Doppler radar, a target range (R) and range-rate are used to select a waveform Pulse Repetition Frequency (PRF) in the computer 24 to maximize the target detectability in the Doppler filters. The waveform PRF is selected so as not to pulse eclipse the target or to place the target in (ambiguous) Doppler near the sample rate of the waveform. The designation range, azimuth, and azimuth standard deviation are used to define the start range for data collection, the start azimuth ($\pm$ three standard deviations from the predicted target azimuth), and the number of beams to be stacked in elevation (range and maximum expected altitude determine the upper elevation bound). The size of the range gate may be fixed or variable but is sized based on uncertainties in target range and motion since last update.

The sequential lobing amplitude data processed through the radar receiver and signal processor is further processed in the elevation angle measurement unit 26. Also, the elevation beam data is collapsed by the signal processor 69 and processed as normal (uncollapsed) data in the computer 24 using the existing tracking algorithm. This technique of parallel processing insures that surveillance coverage in the volume of elevation extraction is not lost. Since mode changes for height finding are not frequent requirements, computer processing time is affected only slightly.

The following paragraphs discuss the implementation of parts of the invention by computer program.

I. Height Extraction Introduction

For selected targets in track, the HEIGHT EXTRACTION algorithm controls the ELSCANS function (discussed below) and processes the received data to estimate selected target elevation and height. The initiate/terminate logic of the HEIGHT REQUEST algorithm identifies targets in track on which height data is desired and commands height requests on a scan-by-scan basis. The HEIGHT EXTRACTION algorithm then controls the placement of the ELSCANS in azimuth and elevation. The signal processor collapses the received detections from each ELSCAN into two dimension (range, azimuth) detections and forms two dimension target plots with the range/azimuth centroiding logic in the signal processor. Plot-to-track correlation is performed by the existing tracking software.

Additionally, the tracking software identifies the plot that correlates with the selected target (i.e., the target on which elevation data is desired). The HEIGHT EXTRACTION algorithm associates a subset of the three dimension ELSCAN reports with the identified plot. Target elevation and height is then estimated from the associated ELSCAN reports data.

Figure 10A:
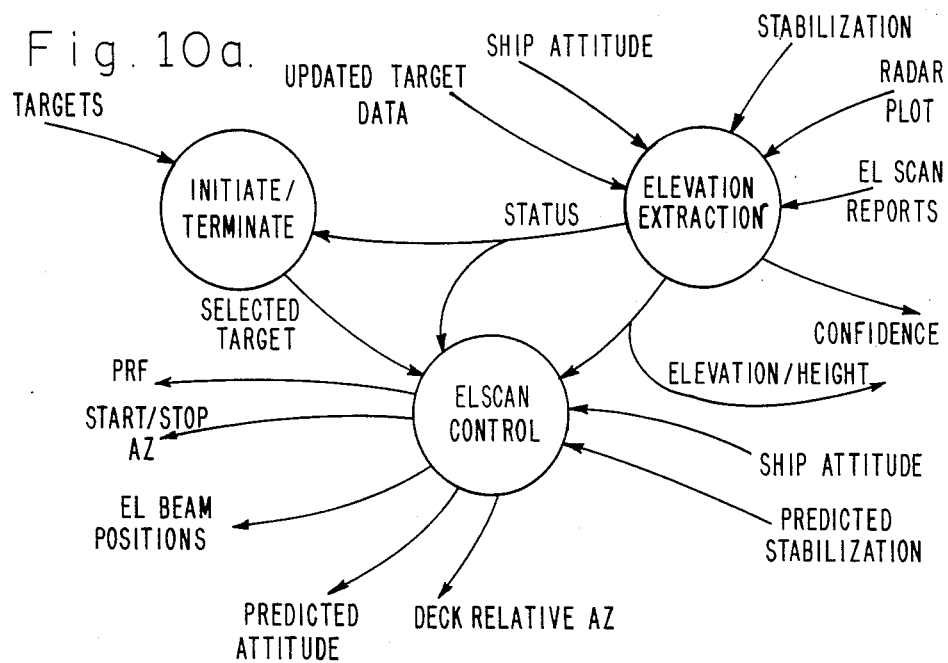
FIG. 10a is a flow chart of the main functions of a computer alogrithm usable in the invention.
Figure 10B:
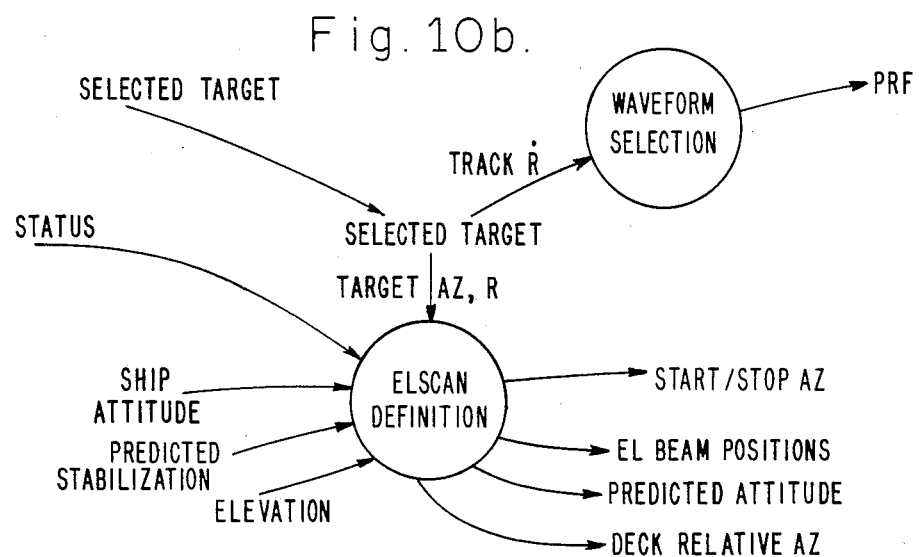
Figure 10C:
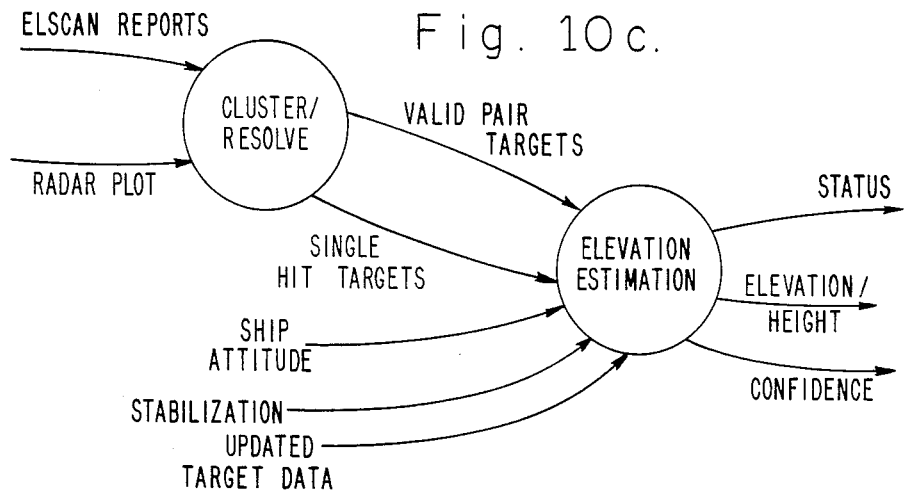

The HEIGHT EXTRACTION algorithm consists of several functional areas which can be divided into two basic operations: ELSCAN Control and Elevation Extraction as shown in FIG. 10a. ELSCAN Control and Elevation Extraction consist of several basic functions shown in FIGS. 10b and 10c and given by:

ELSCAN Control
 (a) Waveform Selection
 (b) ELSCAN Definition
Elevation Extraction
 (a) Cluster/Resolve
 (b) Elevation Estimation These functions are described in more detail in the following paragraphs and figures.

II. Waveform Selection

Figure 10D:
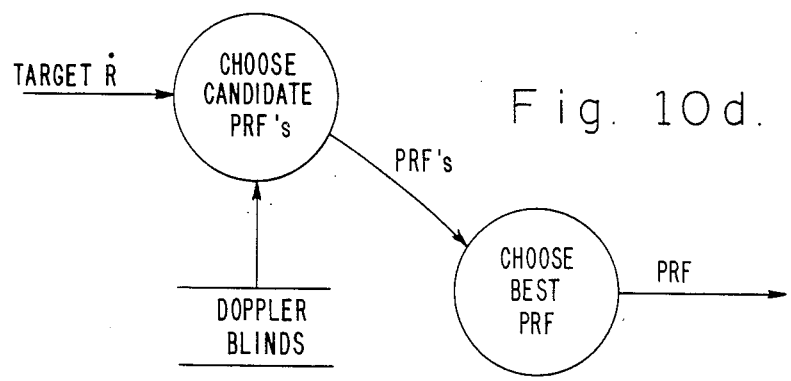

The Waveform Selection Function determines the radar PRF to be implemented during height extraction of the selected target in track. The PRF is selected as defined in the following subparagraphs. The PRF which best insures Doppler visibility on the selected target for the current scan is chosen. This involves the predicted rate of the selected target and the Doppler blind regions for each PRF. There are two Subfunctions of the Waveform Selection Function as shown in FIG. 10d:
(1) Candidate PRF Identification
(2) Best PRF Selection

A. Candidate PRF Identification

The Candidate PRF Subfunction tests the allowable PRF's (either low or high) for visibility against the predicted Doppler of the selected target in track. A PRF is defined as Candidate if the predicted target in track Doppler lies within the defined visible region of the PRF. Two tasks are defined as follows:
(1) Compute predicted target in track Doppler
(2) Test Doppler visibility

1. Compute Target in Track Doppler

The predicted target in track Doppler is computed for each allowable PRF as follows:

$$dRua = \frac{2(f)(dRp)}{(c)}$$

$$dRa = AMOD(dRua, PRFa) + (N)(PRFa)$$

where (
$AMOD(X,Y) = X - (K)(Y)$
$K =$ largest integer $\geq X/Y$ $N = 0$ if $dRp \geq 0$
$\phantom{N} = 1$ if $dRp < 0$ $f =$ radar transmit frequency (frequency to be used for height beams)
$c =$ speed of light
$dRp =$ predicted range rate of target in track
$dRua =$ predicted unambiguous Doppler of target in track
$PRFa =$ Pulse Repetition Frequency (PRF)
$dRa =$ predicted Doppler of target in track

2. Test Doppler Visibility

The Doppler visibility of each allowable PRF for the predicted target in track Doppler is tested to define Candidate PRF's as follows:

if $(dRB)(PRFa) < dRa < (1-dRB)(PRFa)$,
then PRFa becomes a Candidate PRF where
$dRB =$ percent Doppler blind
$PRFa = PRF$
$dRa =$ predicted Doppler of target in track

B. Best PRF Selection

Figure 10E:
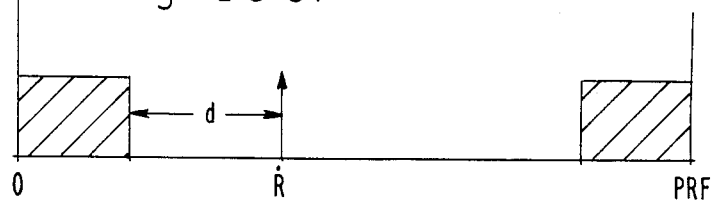
FIG. 10e is a diagram showing the relation of the Doppler blind to the Waveform Selection function of FIG. 10d.

The Best PRF Selection Subfunction tests each Candidate PRF to select the best PRF to be implemented during height extraction. If both the low and high PRFs pass the Doppler visibility test, the Best PRF Selection Subfunction chooses the PRF which maximizes the distance to the closest Doppler blind, as shown in FIG. 10e. Therefore, the best PRF minimizes the probability of the target maneuvering into a Doppler blind during the track prediction interval. Two tasks are defined as follows:
(1) Compute distance to Doppler blind
(2) Maximize distance to Doppler blind

1. Compute Distance to Doppler Blind

For each Candidate PRF, the distance to closest Doppler blind is computed as follows:

$$DB = MIN(dRa - (dRB)(PRFc), (1-dRB)(PRFc) - dRa)$$

where
$MIN(X,Y) =$ minimum value of X,Y
$dRB =$ percent Doppler blind
$PRFc =$ Candidate PRF
$DB =$ distance to closest blind

2. Maximize Distance to Doppler Blind

The Candidate PRF which gives the maximum distance to the closest Doppler blind is defined as the best PRF to be implemented during height extraction. That is, choose the Candidate PRF which maximizes the Doppler blind distance, DB.

III. ELSCAN Definition

Figure 10F:
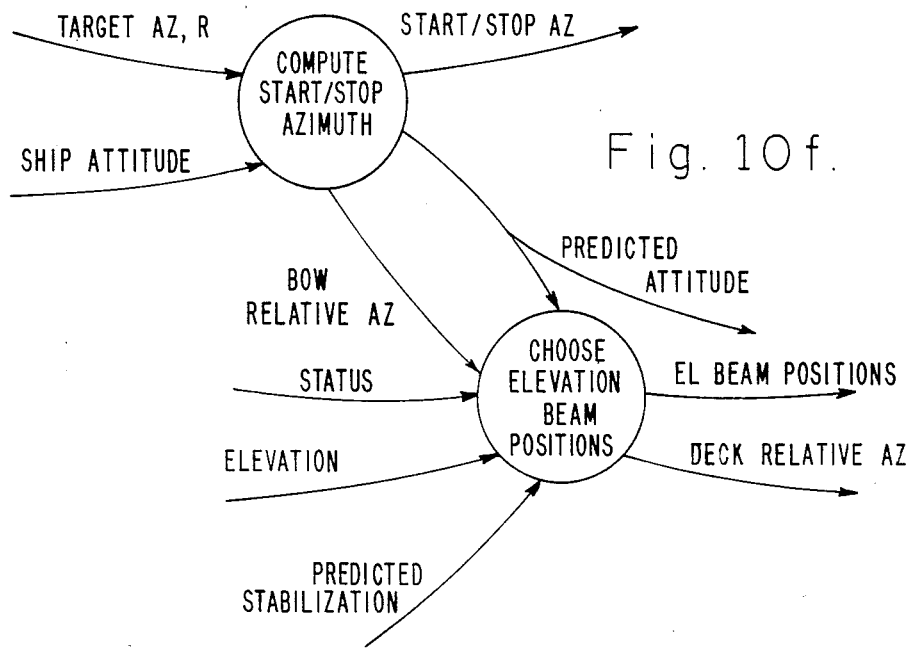

The ELSCAN Definition Function determines the azimuth and elevation beam positions for height extraction of the selected target in track. For this embodiment, the ELSCAN Definition Function is given in terms of a shipboard application. The azimuth positions of the ELSCANS are defined to cover a $\pm 3\sigma$ track azimuth uncertainty. Ship attitude (roll, pitch and yaw) is accounted for by transforming the tracking data received in stabilized coordinates to ship deck coordinates. The elevation beam positions chosen correspond to one of two available sets—the standard or alternate beam sets. A beam set choice is made to maximize the probability of obtaining elevation and minimize the elevation estimation error. Two Subfunctions are shown in FIG. 10f and are defined as follows:

(1) Start/Stop Azimuth Definition
(2) Elevation Beam Position Definition

A. Start/Stop Azimuth Definition

The Start/Stop Azimuth Definition Subfunction defines the start and stop azimuths relative to the radar antenna for the current scan of the height extraction submode. The start and stop azimuths are defined to cover a $\pm 3\sigma$ azimuth uncertainty for the selected target in track while accounting for the deck (ship) attitude in roll, pitch and yaw (i.e., heading). Five tasks are defined as follows:
(1) Yaw (Heading) Correction
(2) Compute Azimuth Window
(3) Roll/Pitch Correction
(4) Compute Desired Start/Stop Azimuth
(5) Dwell Uncertainty Adjustment

1. Yaw (Heading) Correction

Figure 10G:
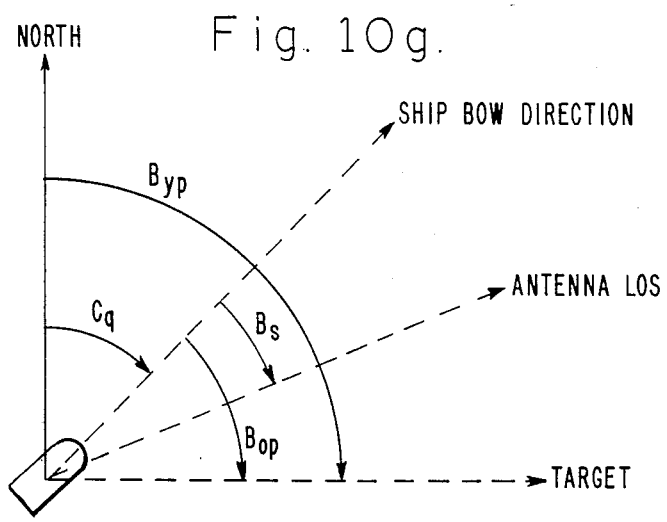
FIG. 10g is a diagram showing a method of yaw correction usable in the invention.

To define the start and stop azimuth relative to the radar antenna, it is necessary to predict at what radar antenna azimuth (bow relative) the radar line of sight (LOS) and target azimuth coincide. The tracking software provides the predicted north relative azimuth of the selected track. Measurements of ship yaw (or heading) indicate the relationship between the ship bow and north. This defines the instantaneous bow relative track azimuth, as shown in FIG. 10g. However, the ship yaw is dynamic and as the antenna rotates toward the target, the ship yaw is changing. Thus, the yaw correction logic utilizes a predicted yaw rate to determine the bow relative azimuth at which the antenna LOS and target azimuth coincide.

The azimuth distance between the radar antenna LOS and the target azimuth is determined by the parameters shown in FIG. 10g. The effective azimuth closing (rotation) rate of the antenna LOS towards the target azimuth is the sum of actual antenna rotation rate plus the yaw rate of the ship's bow. This azimuth distance and effective rotation rate defines the time of coincidence of the radar LOS with the predicted target azimuth and also the radar antenna azimuth (bow relative) at coincidence.

a. Predict time of coincidence of the radar antenna azimuth with the predicted target in track azimuth $$DT = (Bop - Bs)/We$$

where
$Bop = Byp - Cq_2$
$We = W + (Cq_2 - Cq_1)/DT_{21}$
$Bop$ = current predicted bow relative azimuth of target in track
$Bs$ = current radar antenna azimuth (bow relative)
$Byp$ = predicted azimuth of target in track (north referenced)
$We$ = effective antenna rotation rate
$W$ = antenna rotation rate
$Cq_2$ = last measured heading
$Cq_1$ = next to last measured heading
$DT_{21}$ = time between last two heading measurements
$DT$ = time of coincidence of radar antenna azimuth with predicted target in track azimuth b. Compute antenna azimuth (bow relative) and predicted bow relative target in track azimuth at time = (current time + DT) as follows:

$$Bs' = Bs + (W)(DT)$$

where
$Bs$ = current radar antenna azimuth (bow relative)
$W$ = antenna rotation rate
$DT$ = time to coincidence of radar antenna azimuth with predicted target in track azimuth
$Bs'$ = radar antenna azimuth (bow relative) at coincidence time: (current time + DT)

now, by design $$Bop' = Bs'$$

where
$Bop'$ = predicted bow relative target in track azimuth at time = (current time + DT)

2. Complete Azimuth Window

An azimuth window, centered on the predicted bow relative track azimuth at LOS coincidence time, is computed to cover a $\pm 3\sigma$ track azimuth uncertainty. This includes the predicted azimuth variance of the selected track plus the maximum acceleration bias as defined by the tracking software. The result is an azimuth window in stabilized (i.e., local horizontal) coordinates to be covered by the ELSCANS.

$$B_1 = Bop' - G$$

$$B_2 = Bop' + G$$

where
$G = (Ng)\sqrt{Pbp + Ab}$
$Bop'$ = predicted bow relative target in track azimuth at time of coincidence
$G$ = azimuth gate
$Pbp$ = predicted azimuth variance of target in track
$Ab$ = maximum acceleration bias of target in track
$B_1$ = leading edge of azimuth window (bow relative)
$B_2$ = trailing edge of azimuth window (bow relative)
$N_G$ = gate size constant = 3

3. Roll/Pitch Correction

Pitch or excess roll of the ship can cause large azimuth differences between the stabilized (local horizontal) and ship deck reference frames. This azimuth difference is a function of target azimuth and elevation. The previously discussed azimuth window is defined in stabilized coordinates since the tracking functions operate in those coordinates. Therefore, the effect of pitch or excess roll is to distort the azimuth window relative to ship deck coordinates. Thus, roll/pitch correction defines the ELSCAN azimuth boundaries in deck relative coordinates to cover the desired azimuth region from zero to a maximum target elevation. The maximum target elevation is determined by the predicted track range and maximum defined target height. The desired azimuth, elevation region boundaries in stabilized coordinates are transformed to deck relative boundaries based on measurements of pitch and excess roll.

a. Predict ahead pitch and excess roll to time of coincidence as follows:

$$Rp = ((R_2 - R_1)/DT_{21})DT + R_2$$

$Rp' = Rp - RSTAB$ if $Rp > RSTAB$ $\phantom{Rp'} = Rp + RSTAB$ if $-Rp < -RSTAB$ $\phantom{Rp'} = 0$ otherwise $Pp = ((P_2 - P_1)/DT_{21})DT + P_2$
$R_2$ = last measured roll
$R_1$ = next to last measured roll
$DT_{21}$ = time between last two roll/pitch mesurements
$DT$ = time to coincidence
$Rp$ = predicted roll at time of coincidence
$RSTAB$ = platform stabilization capability in roll = 30°
$Rp'$ = predicted excess roll at time of coincidence
$P_2$ = last measured pitch
$P_1$ = next to last measured pitch
$Pp$ = predicted roll at time of coincidence b. Account for excess roll and pitch distortion of azimuth window as follows:

$B_1' = MIN(f(B_1, 0.0, R'p, Pp), f(B_1, Emax, R'p, Pp))$ $B_2' = MAX(f(B_2, 0.0, R'p, Pp), f(B_2, Emax, R'p, Pp))$ where
MIN(X,Y) = minimum value of X,Y
MAX(X,Y) = maximum value of X,Y
$f(B,E,R,P) = \tan^{-1}((\cos(B)\sin(R)\sin(P) + \sin(B)\cos(R) + \tan(E)\sin(R)\cos(P))/(\cos(B)\cos(P) - \tan(E)\sin(P))$
$Emax = \sin^{-1}(Hmax/RNGp)$
$B_1$ = leading edge of azimuth window (bow relative)
$B_2$ = trailing edge of azimuth window (bow relative)
$R'p$ = predicted excess roll at time of coincidence
$Pp$ = predicted pitch at time of coincidence
$Emax$ = maximum target elevation
$Hmax$ = maximum target height = 100,000 feet
$RNGp$ = predicted range of target in track
$B_1'$ = deck relative leading edge of azimuth window
$B_2'$ = deck relative trailing edge of azimuth window

4. Compute Desired Start/Stop Azimuth

The desired Start and Stop azimuth commands are computed to place the center of dwell for the first and last ELSCAN at the azimuth boundaries defined in the roll/pitch correction task. These azimuth commands correspond to the azimuth of the antenna boresight relative to the ship bow. However, elevation beam forward or back scan displaces the beam in azimuth relative to the antenna boresight. Therefore, the amount of elevation beam azimuth scan is modeled to insure proper definition of the start and stop azimuths $B_{st} = B_1' - BFS_1 - (Np_1)(W)/PRF$ $B_{stp} = B_2' + BBS_4 + (Np_4)(W)/PRF$ where
$B_1'$ = deck relative leading edge of azimuth window
$B_2'$ = deck relative trailing edge of azimuth window
$BFS_1$ = forward scan of first beam + ¼ beam width
$BBS_4$ = back scan of last beam − ¼ beam width
$Np_1$ = number of pulses to center of beam one
$Np_4$ = number of pulses to center of last beam
$W$ = antenna rotation rate
$PRF$ = PRF chosen for height submode (best PRF)
$B_{st}$ = desired start azimuth (deck relative)
$B_{st}p$ = desired stop azimuth (deck relative)

5. Adjust for Dwell Uncertainty

The start azimuth is adjusted to insure starting the height submode at or before the desired start azimuth as follows:

$B_{st}' = B_{st} - (N_{2d})(W)/PRFs$ where
$Bst$ = desired start azimuth (deck relative)
$N_{2d}$ = number of pulses in surveillance mode dwell pair
$W$ = antenna rotation rate
$PRFs$ = PRF of background surveillance mode
$B_{st}'$ = start azimuth (deck relative) command
The stop azimuth is not adjusted.

$B_{STP} = Bstp$ where
$Bstp$ = desired stop azimuth (deck relative)
$B_{STP}$ = stop azimuth (deck relative) command

B. Elevation Beam Position Definition

The Elevation Beam Position Definition Subfunction defines the elevation beam positions for the HEIGHT EXTRACTION function. Elevation beam positions are limited to two unique sets: the standard or alternate beam set. A beam set choice is made to maximize the probability of obtaining elevation and minimize the elevation estimation error. Two tasks are defined as follows:
(1) Preliminary Beam Set Choice
(2) Final Beam Set Choice

1. Preliminary Beam Set Choice

The height status of prior height extraction attempts (scans) is used to define the preliminary beam set choice as follows:
  a. First attempt—choose standard beam set
  b. Second attempt
  (1) if height status = no height on last attempt, then chose alternate beam set
  (2) otherwise, choose standard beam set
  c. Subsequent attempts
  (1) if height status = no height on last two attempts, then switch beam set choice from that used on last attempt
  (2) otherwise, keep beam set choice the same as on last attempt

2. Final Beam Set Choice

If a successful height was obtained on the last attempt for the selected target, then the final beam set choice is made to minimize the distance from the last target in track elevation estimate to beam set crossover. The effects of ship pitch and excess roll and electronic pitch stabilization are modeled to predict the target elevation relative to the beam set crossovers. The final beam set choice is determined as follows:
  a. if height status = successful height on last attempt, then
  (1) Predict target azimuth relative to the deck as follows:

$B_d = f(Bop', EL_{st}, Rp', Pp)$ where $f(B,E,R,P) = \tan^{-1}((\cos(B)\sin(R)\sin(P)+\sin(B)\cos(R)+\tan(E)\sin(R)\cos(P))/(\cos(B)\cos(P)-\tan(E)\sin(P)))$ Bop′ = predicted bow relative target in track azimuth at time of coincidence $EL_{st}$ = last elevation estimate on selected target in track Rp′ = predicted excess roll at time of coincidence
Pp = predicted pitch at time of coincidence
$B_d$ = deck relative target in track azimuth at time of coincidence (2) Predict target elevation relative to the stabilized antenna as follows:

$$Emp = \sin^{-1}(A\cos(EL_{st}) + B\sin(EL_{st})) - Cp$$

where
$A = \cos(Bop')\cos(Rp')\sin(Pp) - \sin(Bop')\sin(Rp')$
$B = \cos(Rp')\cos(Pp)$
$EL_{st}$ = last elevation estimate on selected target in track
Bop′ = predicted bow relative target in track azimuth at time of coincidence
Rp′ = predicted excess roll at time of coincidence
Pp = predicted pitch at time of coincidence $Cp$ = predicted elevation stabilization correction at time of coincidence
    = $f(B_d, R_{p'}, Pp)$ with $f$ defined as:

$$f(B,R,P) = -\tan^{-1}\left(\frac{\sin(R)\cos(P)\sin(B) - \sin(P)\cos(B)}{\cos(R)\cos(P)}\right)$$

$B_d$ = reported bow relative azimuth of ELSCAN report
Emp = predicted elevation of selected target in track relative to the stabilized antenna (3) Calculate distance to the nearest crossover for each beam set (STD and ALT) as follows:

$$DE = \text{MIN}(|Emp - E_{c1}|, |Emp - E_{c2}|, |Emp - E_{c3}|)$$

where
|X| = absolute value of X
MIN(X,Y,Z) = minimum value of X,Y,Z
Emp = predicted elevation of selected target relative to the stabilized antenna
$E_c i$ = beam set elevation for the i th crossover (i = 1,2,3)

(4) Pick the beam set (i.e., standard or alternate) which minimizes the distance to beam set crossover (DE) as the final beam set choice b. Otherwise, the final beam set choice is the preliminary beam set choice.

IV. Cluster/Resolve

The Cluster/Resolve Function determines which ELSCAN reports belong ("cluster") with the identified radar plot (i.e., plot that correlated with the selected target). Additionally, the number of targets in each of these "clustered" ELSCANS is resolved. Clustering involves a range and azimuth correlation of ELSCAN reports with the identified plot. Target resolution discriminants correspond to the elevation beam and Doppler filter of the individual ELSCAN detections. Three subfunctions are involved and are presented in FIG. 10j.

(1) Cluster With Radar Plot
(2) Identify ELSCANS
(3) Target Resolution

A. Cluster with Radar Plot

The Cluster With Radar Plot Subfunction determines which ELSCAN reports "cluster" with the identified radar plot in range and azimuth. The identified radar plot is the 2D (range, azimuth) plot that correlated with the selected target and is provided by the tracking software. To cluster with the identified radar plot, an ELSCAN report must be within ±1 range cell and ±½ azimuth beamwidth of the radar plot. Prior to azimuth clustering, the azimuth of each ELSCAN report is corrected by the amount of forward or back scan of the elevation beam. This is required since the ELSCAN report azimuth corresponds to the antenna boresight azimuth while the elevation beams are actually displaced from the boresight by the amount of azimuth scan. Additionally, the collapsed (2D) ELSCAN reports used for tracking have been adjusted for the azimuth scan. Three tasks are defined as follows:

(1) Range clustering
(2) Azimuth correction
(3) Azimuth clustering

1. Range Clustering

The range of each ELSCAN report is compared with the correlated radar plot range. An ELSCAN report at the same range cell as the correlated radar plot "clusters" in range with that plot. That is,
if
$R_d$ = Rcp then
  the ELSCAN report clusters with the correlated plot in range otherwise
  the ELSCAN report can be eliminated from further consideration.

where
$R_d$ = range (range cell) of ELSCAN report
Rcp = range (range cell) of correlated plot

2. Azimuth Correction

The azimuth of each ELSCAN report that clustered in range shall be corrected to account for the elevation beam forward or backscan in azimuth as follows:

$$B_{dc} = B_d + Bscan$$

where
$B_d$ = reported bow relative azimuth of ELSCAN report
Bscan = amount of electronic azimuth scan for the elevation beam of the ELSCAN report
$B_{dc}$ = corrected bow relative azimuth of ELSCAN report

3. Azimuth Clustering

The corrected azimuth of each ELSCAN report that clustered in range will be compared with the correlated radar plot azimuth. An ELSCAN report within ½ azimuth beamwidth of the correlated radar plot "clusters" in azimuth with that plot. That is, if $$\left| \frac{B_{dc} - B_{cp}}{B3dB} \right| \leq .5$$

then the ELSCAN report clusters with the correlated plot in azimuth
otherwise the ELSCAN report can be eliminated from further consideration where
$|X|$ = absolute value of X
$B_{dc}$ = corrected bow relative azimuth of ELSCAN report
$B_{cp}$ = measured azimuth of correlated plot (before psuedo-pitch stabilization)
$B3dB$ = 3dB azimuth beamwidth

B. Identify ELSCANS

The Identify ELSCANS Subfunction groups all the clustered ELSCAN reports into ELSCAN sets. An ELSCAN set is comprised of four reports, one for each elevation beam of the same azimuth and range. The ELSCAN sets are then ordered by beam number. Additionally, the amplitude of each ELSCAN beam report is adjusted to account for Doppler filter gain differences. Two tasks are defined as follows:
(1) Azimuth sort
(2) Elevation beam ordering

1. Azimuth Sort

Clustered reports are separated into ELSCAN sets by azimuth. At this point, the clustered reports comprise a maximum of two ELSCAN sets. These ELSCAN sets will be separated by at least ½ azimuth beamwidth. That is, if $$\left| \frac{B_{dc}(i) - B_{d2}(k)}{B3dB} \right| \geq .5$$

then reports i and k belong to different ELSCANS where
$B_{dc}(i)$ = corrected bow relative azimuth of report i
$B3dB$ = 3dB azimuth beamwidth

2. Elevation Beam Ordering

The ELSCAN sets shall be ordered by the report elevation beam number (NB); the lowest beam denoted beam number one.

C. Target Resolution

The Target Resolution Subfunction determines the number of targets in each clustered ELSCAN set. Resolution discriminants correspond to elevation beam and Doppler filter. Additionally, valid pairs are chosen for elevation beamsplitting. Four tasks are defined as follows:
(1) Elevation Resolution
(2) Doppler Filter Test
(3) Hit/No Hit Pair
(4) Pair Validity

1. Elevation Resolution

Figure 10H:
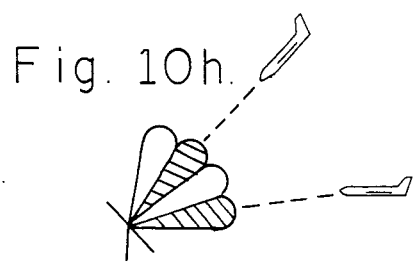
FIG. 10h is a diagram of a method of target elevation position resolution usable in the invention.

Targets are resolved in elevation by a separation of more than one elevation beam between detections as shown in FIG. 10h. Thus, the detection status (i.e., threshold crossing) of each ELSCAN report is checked to identify ELSCAN detections. Elevation beams with no detection (i.e., amplitude below threshold) separate targets:
a. Note detection status of each ELSCAN beam report if TX=1, then status=detection if TX=0, then status=no detection where TX=detection bit of beam report (threshold crossing)
b. Separate ELSCAN beam reports with status=detection into elevation groups while satisfying the following conditions:
(1) minimum number of groups possible
(2) detections in adjacent elevation beams belong to the same group. Adjacent elevation beam reports are defined as follows:

if $|NB(i) - NB(k)| = 1$
then reports are in adjacent elevation beams where
NB(k) = beam number of kth report
$|x|$ = absolute value of X

2. Doppler Filter Test

Figure 10I:
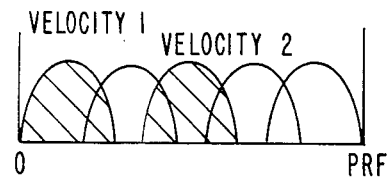
FIG. 10i is a diagram showing a method of resolving targets in Doppler usable in the invention.
Figure 10J:
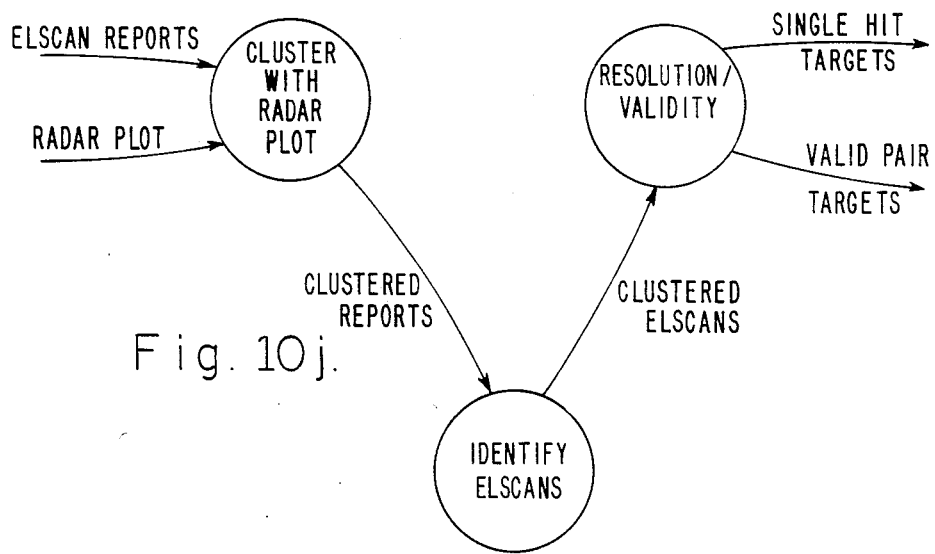

Targets are resolved in Doppler by a separation of more than one Doppler filter between ELSCAN detections as shown in FIG. 10i. Therefore, ELSCAN detections not resolved (i.e., separated) in elevation can be resolved by Doppler separation:
a. Separate elevation groups comprised of $\geq 2$ detections into target groups while satisfying the following conditions:
(1) minimum number of groups possible
(2) detections in adjacent elevation beams belong in the same target group if their report Dopplers are within one Doppler filter. Within one Doppler filter is defined as follows:

if $|DFN(i) - DFN(k)| \leq 1$
then reports are within one Doppler filter where
DFN(K) = Doppler filter number of Kth detection
$|X|$ = absolute value of X
Adjacent elevation beam detections are defined above.
b. Elevation groups comprised of only a single detection automatically become target groups.

3. Hit/No Hit Pair

The hit/no hit pair task pairs a single detection target (i.e., ELSCAN detection resolved from all other detections in either elevation or Doppler) with a no detection ELSCAN report. The no detection ELSCAN report must be in a neighboring elevation beam and within a Doppler filter of the single detection ELSCAN report. This pairing allows beamsplitting even on a single threshold crossing which provides a more accurate elevation estimate than that otherwise available on a single beam detection (e.g., peak of beam estimate).
a. Maximum of one elevation beam with status=no detection paired to each single detection target group b. The no detection elevation beam and the single detection target group pair must be in adjacent elevation beam where adjacent elevation beams are defined in 1. above.

c. The no detection elevation beam and the single detection target group pair must be within one Doppler filter where within one Doppler filter is defined in 2. above.

d. Resolve multiple pairings (i.e., greater than one no detection elevation beam to a single detection target group) by choosing the no detection elevation beam with the largest amplitude (AB).

e. Single detection target groups with no possible pair become single hit targets.

4. Pair Validity

The amplitude difference of each candidate pair is compared against a maximum and minimum value for beamsplitting. These maximum and minimum values are defined for each two adjacent beams to avoid beamsplitting much beyond the beam peaks. This helps insure validity of the data for beamsplitting and avoids serious beamsplitting errors.

a. consider only candidate pairs which correspond to:
(1) Adjacent elevation beam reports of multiple detection target groups
(2) Single detection target group/no detection beam pair b. if $MINdb \leq DdB \leq MAXdB$
then Candidate pair is a valid pair
where $DdB$ = pair amplitude difference
 = amplitude of higher beam number pair member minus amplitude of lower beam number pair member $MINdB$ = minimum allowable amplitude difference
$MAXdB$ = maximum allowable amplitude difference
c. maximum of one valid pair per target group
d. if multiple valid pairs exist in a target group, choose the pair which maximizes the minimum amplitude of the pair
e. if no valid pairs exist in a target group
(1) the single detection target group/no detection pair may be eliminated from further consideration
(2) for the multiple detection target group, the report of maximum amplitude becomes a single hit target and all other reports may be eliminated from further consideration.

V. Elevation Estimation

Figure 10K:
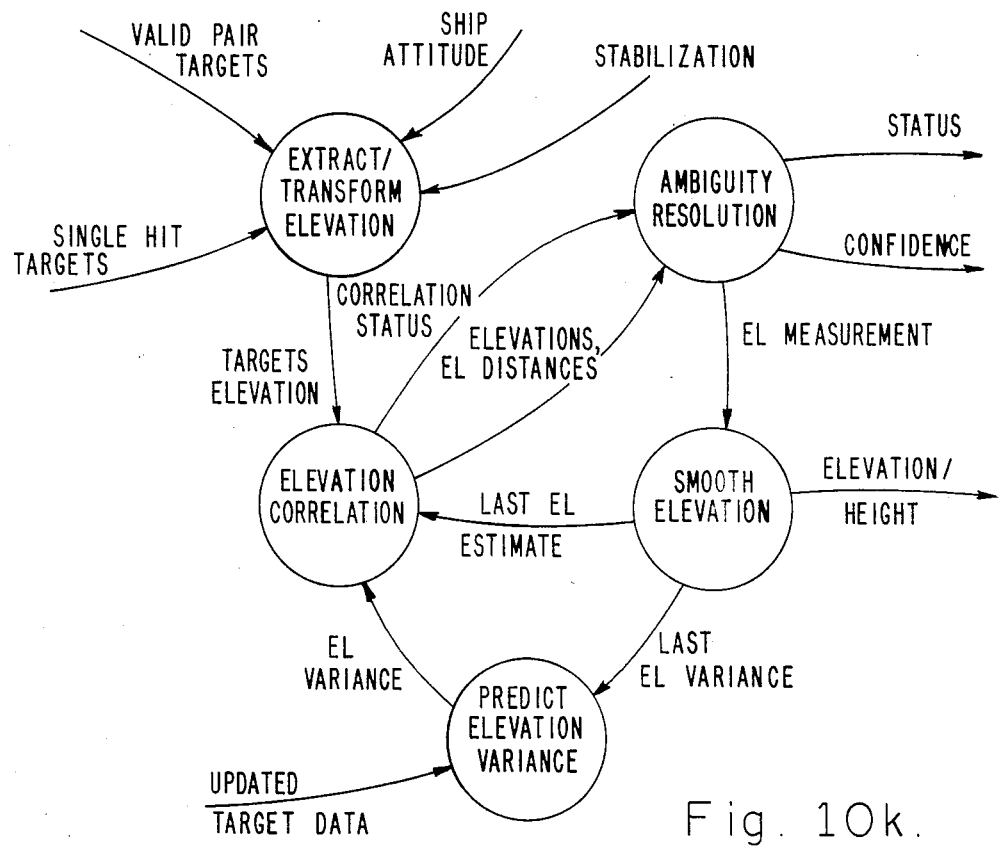

The Elevation Estimation Function computes target elevations and transforms this deck relative elevation measurement into stabilized (local horizontal) elevation. Correlation and ambiguity resolution are performed to associate at most one of the current target elevation estimates with the selected target. Additionally, scan to scan smoothing of the elevation measurements on the selected target is performed to improve elevation accuracy. Five Subfunctions are shown in FIG. 10k and are defined as follows:
(1) Extract/Transform Elevation Measurement
(2) Predict Elevation Variance
(2) Elevation Correlation
(3) Ambiguity Resolution
(5) Smooth Elevation

A. Extract/Transform Elevation Measurement

The Extract/Transform Elevation Measurement Subfunction computes the target elevation of all single detection targets and valid pair targets and transforms this measurement into stabilized (local horizontal) elevation. Elevation for valid pair targets is computed by a sequential lobing beamsplitting equation given by $$EL_m = \sin^{-1}((C_0 + C_1 D_{dB} - C_2 D_{dB}^2 - C_3 D_{dB}^3)F_H/F) + \phi_T$$

where $$C_0 = -\frac{(\psi_0 - (N - \frac{1}{2})\Delta\psi)\lambda_H}{360 d}$$

$\Psi_0 = -360(d/\lambda) \sin \alpha$
$\Delta\Psi = -360(d/\lambda_H)(\sin \alpha - \sin \beta)$
$EL_m$ = target elevation measurement in deck coordinates
$\phi_T$ = tilt back of antenna
$C_1 = 1.563 \times 10^{-2}$
$C_2 = 5.187 \times 10^{-7}$
$C_3 = 1.498 \times 10^{-5}$
$F_H$ = high radar transmit frequency
$F$ = radar transmit frequency used
$N$ = beam crossover number
$d$ = interelement spacing
$\lambda_H$ = wavelength at $F_H$
$\lambda$ = wavelength at $F$
$D_{dB}$ = amplitude in dB difference (higher beam-lower beam, one way)
$\alpha$ = antenna elevation of lower beam
$\beta$ = antenna elevation of upper beam Elevation for single detection targets is set to a default value as follows:

Beam 2 or 4:

$\phi$ = beam peak elevation

Beam 1:

$\phi = (E_{min} + \text{beam peak elevation})/2$

Beam 4:

$\phi = (E_{max} + \text{beam peak elevation})/2$ where
$E_{max}$ = maximum target elevation = 70°
$E_{min}$ = minimum target elevation = 0°

Pitch or excess roll can cause significant differences in elevation between the stabilized (local horizontal) and ship deck reference frames. This elevation difference is a function of target azimuth and elevation. Therefore, measurements of pitch and excess roll are used to transform the deck relative elevation measurement to stabilized (local horizontal) elevation as a function of measured elevation and azimuth. The target elevation estimate of each single hit target and valid pair target is transformed to local horizontal elevation to account for ship pitch and excess roll as follows:

$$EL_t' = \sin^{-1}(A \cos(EL_t) + B \sin(EL_t))$$

where
$A = \sin(B_{dc})\cos(Pp) \sin(Rp') - \cos(B_{dc})\sin(Pp)$ $B = \cos(Pp)\cos(Rp')$
Pp = predicted pitch at time of coincidence
Rp' = predicted excess roll at time of coincidence
$B_{dc}$ = corrected bow relative azimuth of report
$EL_t$ = deck relative target elevation
$EL_t'$ = local horizontal relative target elevation

B. Predict Elevation Variance

The Predict Elevation Variance Subfunction predicts the elevation variance on the selected target ahead to the current scan. A constant elevation model is assumed with model noise to account for possible rate of change of elevation. The elevation variance is predicted as follows:

$$VEL_p = VEL_s + (D_{TE}\, 180\, V_{max})/(\pi R)2/3$$

where:
$VEL_p$ = predicted elevation variance
$VEL_s$ = smoothed elevation variance for last estimate on selected track
$D_{TE}$ = time since last estimate
R = current filtered track range
$V_{max}$ = maximum target vertical speed

C. Elevation Correlation

The Elevation Correlation Subfunction checks for correlation of the current measurements with the last elevation estimate on the selected target. Correlation is based on a $3\sigma$ gate as follows:

if $D_{E2} < (N_{GE})^2 (VEL_m + VEL_p)$
then correlation is successful
where:
$D_{E2}$ = elevation difference squared
$N_{GE}$ = elevation gate constant = 3
$VEL_m$ = elevation measurement variance
$VEL_p$ = predicted elevation variance

D. Ambiguity Resolution

The Ambiguity Resolution Subfunction performs the final assignment of elevation measurement to selected target in track. Ambiguities are resolved to choose the best elevation measurement. Additionally, the height status is updated. Three tasks are defined as follows:
(1) Exercise Priorities
(2) Final Assignment/Resolve Ambiguities
(3) Update Height Status

1. Exercise Priorities

The following priorities are established to eliminate elevation measurements from consideration if multiple targets exist:
(a) Correlated Targets over Uncorrelated Targets: if correlated targets exist, eliminate all uncorrelated targets from further consideration
(b) Valid Pair Targets over Single Hit Targets: after exercising (a), if valid pair targets exist, eliminate all single hit targets from further consideration.

2. Final Assignment/Resolve Ambiguities

If ambiguities (i.e., multiple elevation measurements to choose from) remain after exercising priorities, resolution is accomplished as follows:
(a) For measurements correlated in elevation with last elevation estimate,
measurement that minimizes the distance to the last elevation estimate is chosen (b) For measurements uncorrelated in elevation with last elevation estimate,
measurement that minimizes distance to the Doppler of selected target is chosen
However, if height was successfully obtained on the last attempt for the selected target, an uncorrelated (in elevation) measurement is not chosen.

3. Update Height Status

The height status is updated following each height extraction attempt to reflect conditions as follows:
(a) No elevation chosen (assigned to selected target) on current attempt
(b) No elevation chosen on current attempt and last attempt
(c) Elevation chosen on current attempt with confidence given by
(1) reliable—for two detection target
(2) unreliable—for single detection or hit/no hit pair target

E. Smooth Elevation

The Smooth Elevation Subfunction combines scan-to-scan elevation measurements on a selected target to improve elevation accuracy. The selected target height is also calculated. Initialization of the elevation filter is as follows:

$$EL_s = EL_m$$

$$VEL_s = VEL_m$$

where:
$EL_m$ = current elevation measurement
$VEL_m$ = current elevation measurement variance
$EL_s$ = current smoothed elevation estimate
$VEL_s$ = current smoothed elevation variance
Elevation smoothing is as follows:

$$K_s = VEL_p/(VEL_p + VEL_m)$$

$$EL_s = EL_p + K_s(EL_m - EL_p)$$

$$VEL_s = (1 - K_s)(VEL_p)$$

where:
$EL_p$ = predicted elevation = last smoothed elevation
$K_s$ = smoothing gain
Target height for the selected target is calculated assuming a 4/3 earth model as follows:

$$H_T = R \sin EL_s + H_R + R_2 \cos^2 EL_s/(2 \cdot 4/3 \cdot RE)$$

where:
R = current filtered target range
$H_R$ = antenna height
$R_E$ = earth radius
$H_T$ = target height To convert a two dimension radar system to a radar system with three dimension data extraction in accordance with the invention, the additions of a phase shift antenna having two scan patterns in elevation and mechanical rotation in azimuth, a beam steering unit for obtaining the appropriate antenna beam patterns, an elevation angle measurement unit (either hardware or software implemented) used during the elevation sequential lobing process and a modified two dimension radar computer program that provides the timing, control and data for the elevation scanning processes along with measurement of the elevation angle, are required.

FIGS. 11a, 11b and 11c are diagrams presenting the typical operation radar system incorporating the invention. During the normal surveillance scan, the 2D wide elevation beam pattern is used as is shown in FIGS. 11a and 11b. The radar system will detect, acquire and track targets in 2D and will display track symbols as shown in FIG. 11b around the video returns. Target speed is depicted as velocity leaders whose length represents the magnitude of speed and the leader direction is the target heading (see FIG. 11b).

When elevation angle data is required on a target in track, the computer 24 will establish a range and bearing window ($\pm R$, $\pm \theta_A$) at the predicted position of the selected target. When the antenna azimuth position matches the leading side of the azimuth window, the wide elevation beam pattern is changed to the narrow elevation beam pattern of A° as is shown in FIG. 11c. In this embodiment, the narrow beam is sequentially lobed through four beam positions which cover B° and all targets are detected in the normal manner for target in track updates. When antenna azimuth position matches the trailing edge of the azimuth window, the beam pattern is changed to the fan beam or 2D elevation beam pattern as shown in FIG. 11a. The selected target is also updated for range and bearing and in addition, the strongest target signal in the range interval on adjacent beams is measured. The signal processing equipment converts this amplitude ratio measurement to an elevation angle and the accuracy will typically be on the order of 1/10 of the A° beam for a single scan.

In order to provide more accurate measurement accuracy, the elevation position of all beams can be repositioned to center the measured target's elevation position of past scans between two adjacent beams and take a second measurement on the next scan. This measurement can improve the first measurement by approximately 1/20 of the A° beam.

In the frequency dependent multipath lobing area which is typically about 5° in elevation for surveillance efficient L-Band radars, the target elevation angle data sometimes can not be reliably extracted. This multipath area is shown in FIG. 11c. Therefore, if the target is not measured above 5°, this will be indicated to the weapon system. A weapon system tracking radar will then know to search only in this lower elevation area to locate the target.

Through use of the invention, response time to a target is substantially reduced. Weapon system lock on time is minimized hence weapon system fire power is increased. The invention provides the ability to gather the third dimension data (elevation) of designated targets simulataneously with the two dimension data, thus saving radar energy and scan time and decreasing the time to weapon system firing. By providing three dimension data on selected targets only, more efficient use of radar resources is achieved.

Although the invention has been described and illustrated in detail, it should be understood that this description and illustration are by way of an example embodiment only and are not meant to be taken as limitations on the scope of the invention. For example, the beam steering unit was discussed and illustrated as a separate unit, however it may be implemented in other ways known to those skilled in the art. Also, the elevation angle extraction mode is shown as using four narrow elevation beams. The number of beams used and their exact size may vary depending on the application but these variances are not outside the scope of the invention. Likewise, the application of the invention was discussed and illustrated in terms of a shipboard application, however it should be apparent that the invention may be applied elsewhere without exceeding the scope of the invention. The invention should be construed in connection with the following claims.

What is claimed is:

1. A radar system for a selectable three dimension or two dimension position indication of targets within the surveillance volume comprising:
   an antenna adapted for selectively directing a fan beam and a narrow beam, wherein the narrow beam is scannable in elevation angle and has a narrower beamwidth in elevation angle than the fan beam;
   a two dimension radar system coupled to the antenna for transmitting signals into the surveillance volume and for receiving reflected target signals from the antenna and for processing the reflected signals by means including at least one receiver for indicating the azimuth and range of the targets; and
   an elevation angle measurement means coupled to the antenna and to the two dimension radar system for determining the elevation position of a selected target by selecting and sequentially lobing the narrow beam through a plurality of positions, and by receiving from the at least one receiver of the two dimension radar system reflected signals received from the selected target by the two dimension radar system during the scanning of the narrow beam and by processing those signals to indicate the elevation position of the selected target.

2. The radar system of claim 1 wherein:
   the elevation angle measurement means is further for providing the antenna with a control signal at the azimuth position of a selected target; and
   the antenna comprises control means for electronically scanning the narrow beam in elevation angle in response to the control signal.

3. The radar system of claim 2 wherein the antenna is a planar phased array antenna.

4. The radar system of claim 1 wherein the antenna comprises rotation means for rotating the antenna about a substantially vertical axis for scanning in the azimuth angle.

5. The radar system of claim 1 wherein:
   the narrow beam is sequentially scanned in a plurality of selected overlapping elevation angle positions; and
   the elevation angle measurement means comprises a comparator means for comparing reflected signals from the selected target in one selected elevation angle position to reflected signals from the selected target in an overlapping elevation angle position.

6. The radar system of claim 5 wherein the elevation angle measurement means further comprises a computing means for controlling the narrow beam wherein the computing means determines an azimuth window about a selected target, controls the antenna to select the narrow beam at the beginning of the azimuth window and controls the antenna to scan the narrow beam in the overlapping elevation angle positions while in the azimuth window.

7. The radar system of claim 6 wherein the elevation angle measurement means further comprises a second computing means, coupled to the comparator means, for receiving the comparisons of reflected signals, comparing the comparisons to each other and determining the elevation position of the selected target thereby.

8. The radar system of claim 6 wherein the computing means is further for controlling the antenna to scan the narrow beam in elevation angle a plurality of times for the selected target and for varying the overlapping positions of the narrow beam whereby the accuracy of the indication of the elevation position of the selected target is increased.

9. The radar system of claim 6 wherein the computing means also determines a range window about the selected target and controls the elevation angle measurement means to process only the reflected signals of targets located in the range window.

10. A radar system for a selectable three dimension or two dimension position indication of targets within the surveillance volume comprising:
- a planar phased array antenna adapted for selectively directing a fan beam and a narrow beam wherein the narrow beam is scannable in elevation angle and has a narrower beamwidth in elevation angle than the fam beam;
- a two dimension radar system coupled to the antenna for transmitting signals into the surveillance volume and for receiving reflected target signals from the antenna and for processing the reflected signals by means including at least one receiver for detecting and locating the position of the targets in terms of azimuth and range; and
- a processing means coupled to the antenna and to the two dimension radar system for determining the elevation position of selected targets by selecting the narrow beam at the azimuth position of a selected target, sequentially lobing the narrow beam in a plurality of selected overlapping elevation angle positions, receiving from the at least one receiver of the two dimension radar system reflected energy from the selected target received by the two dimension radar system in the overlapping elevation angle positions, comparing the reflected energy received at the different elevation angle positions, and determining the elevation position of the selected target thereby.

11. A radar system for a selectable three dimension or two dimension position indication of targets within the surveillance volume comprising:
- a planar phased array antenna adapted for selectively directing a fan beam and a narrow beam wherein the narrow beam is scannable in elevation angle and has a narrower beamwidth in elevation angle than the fam beam;
- a two dimension radar system coupled to the antenna for transmitting signals into the surveillance volume and for receiving reflected target signals from the antenna and for processing the reflected signals for detecting and locating the position of the targets in terms of azimuth and range;
- a processing means coupled to the antenna and to the two dimension radar system for determining the elevation position of selected targets by selecting the narrow beam at the azimuth position of a selected target, scanning the narrow beam in a plurality of selected overlapping elevation angle positions, receiving from the two dimension radar system reflected energy from the selected target received by the two dimension radar system in the overlapping elevation angle positions, comparing the reflected energy received at the different elevation angle positions, and determining the elevation position of the selected target thereby;
- and wherein the processing means also collapses the reflected energy during the use of the narrow beam, and transmits the collapsed energy to the two dimension radar system whereby the two dimension radar system continues to detect and locate targets while the processing means determines the elevation position of the selected target.

12. The radar system of claim 1 wherein the elevation angle measurement means comprises a computing means responsive to programming residing therein for determining the elevation position of the selected target by:
- initiating the programming in response to a request therefor;
- determining an azimuth window about the selected target;
- controlling the antenna to select the narrow beam at the beginning of the azimuth window;
- scanning the narrow beam in a plurality of selected elevation positions while in the azimuth window;
- determining a range cell about the selected target; and
- resolving the selected target from the reflected signals received during use of the narrow beam.

13. The radar system of claim 12 wherein the computing means is further for selecting a particular pulse repetition frequency to minimize the probability of the selected target maneuvering into a Doppler blind region in the current scan.

14. The radar system of claim 13 wherein the computing means is further for choosing the PRF which maximizes the distance between the selected target Doppler and the closest Doppler blind in its selection of a particular pulse repetition frequency.

15. The radar system of claim 12 wherein the computer means is further for selecting the elevation positions when scanning the narrow beam so that the distance from the target to the crossover point of two beams is minimized.

16. A radar system for a selectable three dimension or two dimension position indication of targets within the surveillance volume comprising:
- an antenna adapted for selectively directing a fan beam and a narrow beam, wherein the narrow beam is scannable in elevation angle and has a narrower beamwidth in elevation angle than the fan beam;
- a two dimension radar system coupled to the antenna for transmitting signals into the surveillance volume and for receiving reflected target signals from the antenna and for processing the reflected signals for indicating the azimuth and range of the targets;
- an elevation angle measurement means coupled to the antenna and to the two dimension radar system for determining the elevation position of a selected target by selecting and scanning the narrow beam, and by receiving from the two dimension radar system reflected signals received from the selected target by the two dimension radar system during the scanning of the narrow beam and by processing those signals to indicate the elevation position of the selected target;
- the elevation angle measurement means comprises a computing means responsive to programming residing therein for determining the elevation position of the selected target by:
initiating the programming in response to a request therefor;
determining an azimuth window about the selected target;
controlling the antenna to select the narrow beam at the beginning of the azimuth window;
scanning the narrow beam in a plurality of selected elevation positions while in the azimuth window;
determining a range cell about the selected target; and
resolving the selected target from the reflected signals received during use of the narrow beam;
the computer means is further for collapsing the reflected signals received during use of the narrow beam to form two dimension target plots and correlating the target plots with the reflected signals received from the selected target during use of the narrow beam to resolve the selected target.

17. The radar system of claim 16 wherein the step of correlating comprises correlating the range cell and azimuth position of the selected target with the target plots.

* * * * *

UNITED STATES PATENT AND TRADEMARK OFFICE
CERTIFICATE OF CORRECTION

PATENT NO. : 4,649,390

DATED : March 10, 1987

INVENTOR(S) : Dennis Moraitis, et al.

It is certified that error appears in the above-identified patent and that said Letters Patent is hereby corrected as shown below:

Column 5, line 3, after "elevation" add --angle--;

Column 15, line 57, replace "where(" with --where--;

Column 18, line 16, replace "Complete" with --Compute--;

Column 27, line 32, replace " < " with -- $\leq$ --;

Column 28, line 52, replace "$R_2$" with --$R^2$--; and

Column 31, line 25, replace "f transmitting" with --for transmitting--.

Signed and Sealed this

Twenty-fifth Day of October, 1988

*Attest:*

DONALD J. QUIGG

*Attesting Officer*  *Commissioner of Patents and Trademarks*